United States Patent
Inoue et al.

(10) Patent No.: US 12,275,353 B2
(45) Date of Patent: Apr. 15, 2025

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Kazuyuki Inoue, Nagoya (JP); Yurika Tanaka, Yokosuka (JP); Satoshi Komamine, Nagoya (JP); Go Tanaka, Toyota (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 357 days.

(21) Appl. No.: 17/867,917

(22) Filed: Jul. 19, 2022

(65) Prior Publication Data

US 2023/0056806 A1  Feb. 23, 2023

(30) Foreign Application Priority Data

Aug. 18, 2021 (JP) .................... 2021-133706

(51) Int. Cl.
*B60R 11/00* (2006.01)
*A47G 29/14* (2006.01)
*G01C 21/36* (2006.01)
*G06Q 10/08* (2024.01)
*G06Q 10/083* (2024.01)
(Continued)

(52) U.S. Cl.
CPC .............. *B60R 11/00* (2013.01); *A47G 29/14* (2013.01); *G01C 21/3605* (2013.01); *G06Q 10/08* (2013.01); *G06Q 10/083* (2013.01); *G06Q 10/0832* (2013.01); *G06Q 10/0836* (2013.01); *G06Q 10/087* (2013.01); *G06Q 20/18* (2013.01); *G07C 9/00912* (2013.01); *B60R 2011/0036* (2013.01); *G07C 2009/0092* (2013.01)

(58) Field of Classification Search
CPC ............ B60R 11/00; B60R 2011/0036; G01C 21/3605; G06Q 50/40; G06Q 10/083; G06Q 10/08; G06Q 10/0836; G06Q 10/0832; G06Q 20/18; G06Q 10/087; G07C 9/00912; G07C 2009/0092; A61L 2/10; A47G 29/14
See application file for complete search history.

(56) References Cited

U.S. PATENT DOCUMENTS

2018/0350177 A1* 12/2018 Dautz .................. G06Q 20/327
2019/0130349 A1*  5/2019 Ferguson ......... G06Q 10/08355
(Continued)

FOREIGN PATENT DOCUMENTS

JP   2016-045665 A    4/2016
JP   2018-180949 A   11/2018
(Continued)

*Primary Examiner* — Roberto Borja
(74) *Attorney, Agent, or Firm* — Oliff PLC

(57) ABSTRACT

An information processing device includes a processor. The processor is configured to control a vehicle including a storage apparatus including one or more compartments configured such that a user deposits baggage. The processor is configured to, when a predetermined event related to storage of the baggage has occurred in the storage apparatus, restrict deposit of the baggage into the storage apparatus by the user until the vehicle including the storage apparatus moves to a predetermined place where the predetermined event is resolvable.

12 Claims, 14 Drawing Sheets

(51) Int. Cl.
  *G06Q 10/0832* (2023.01)
  *G06Q 10/0836* (2023.01)
  *G06Q 10/087* (2023.01)
  *G06Q 20/18* (2012.01)
  *G07C 9/00* (2020.01)

(56) References Cited

U.S. PATENT DOCUMENTS

2021/0308300 A1* 10/2021 Rathi ................... A61L 2/04
2021/0394774 A1* 12/2021 Zhang ............... B60W 60/0025

FOREIGN PATENT DOCUMENTS

JP  2021-033732 A  3/2021
WO  WO-2019117908 A1 *  6/2019  ......... G01C 21/3407

* cited by examiner

| VEHICLE ID | CURRENT LOCATION | STATUS | ROUTE |
|---|---|---|---|
| V001 | × × × | × × × | × × × |
| V002 | × × × | × × × | × × × |
| V003 | × × × | × × × | × × × |
| . . . | . . . | . . . | . . . |

FIG. 6

| VEHICLE ID | BOX NUMBER | USER ID | DEPOSIT LOCATION | DEPOSIT DATE | TAKEOUT LOCATION | TAKEOUT DATE | LEVEL | AVAIL ABILITY |
|---|---|---|---|---|---|---|---|---|
| V001 | 001 | xxx xxx | xxx xxx | xxx xxx | xxx xxx | xxx xxx | 1 | YES |
| | 002 | xxx xxx | xxx xxx | xxx xxx | xxx xxx | xxx xxx | 2 | NO |
| | 003 | — | — | — | — | — | 3 | NO |
| ⋮ | ⋮ | ⋮ | ⋮ | ⋮ | ⋮ | ⋮ | ⋮ | ⋮ |

FIG. 7
| CLEANING PLACE ID | LOCATION | AVAILABLE PERIOD | HANDLEABLE LEVEL |
|---|---|---|---|
| × × × | × × × | 10:00 - 12:00 DAILY | 2 |
| × × × | × × × | 8:00 - 17:00 WEEKDAYS | 2 |
| × × × | × × × | 24/7 | 3 |
| . . . | . . . | . . . | . . . |
FIG. 8
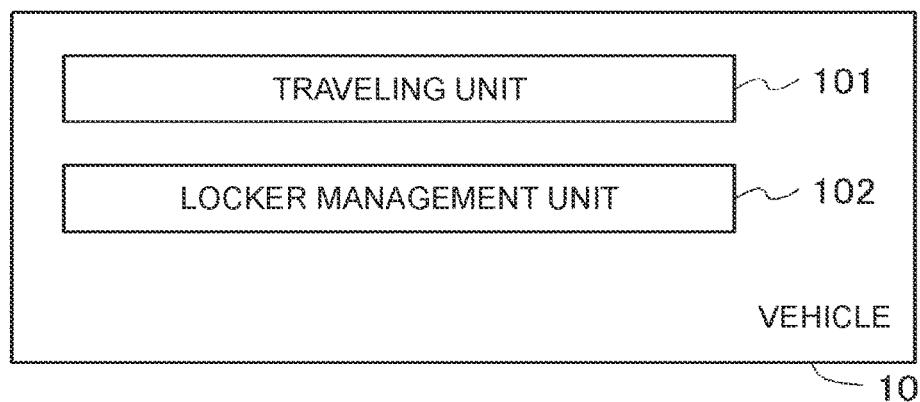
FIG. 9
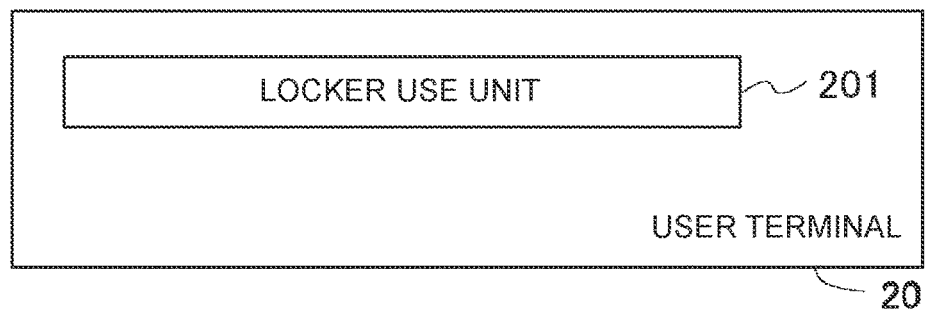

INFORMATION PROCESSING DEVICE AND INFORMATION PROCESSING METHOD

CROSS-REFERENCE TO RELATED APPLICATION

This application claims priority to Japanese Patent Application No. 2021-133706 filed on Aug. 18, 2021, incorporated herein by reference in its entirety.

BACKGROUND

1. Technical Field

The present disclosure relates to an information processing device and an information processing method.

2. Description of Related Art

There is known a technology in which an odor sensor is provided in a locker and an output from the odor sensor is used to check a possibility that baggage is a rotten object or a deleterious substance (see, for example, Japanese Unexamined Patent Application Publication No. 2021-033732 (JP 2021-033732 A)). There is known a technology in which a gas sensor is provided to detect an odor in a storage locker and determination is made that an abnormality has occurred when the detected value of the sensor exceeds a predetermined threshold (see, for example, Japanese Unexamined Patent Application Publication No. 2016-045665 (JP 2016-045665 A)).

SUMMARY

If an odor or soil remains in the locker, the locker may be unusable or the next user may have discomfort. The present disclosure provides an information processing device and an information processing method for taking more appropriate measures when an abnormality occurs in a storage apparatus due to baggage deposited by a user.

In a first aspect of the present disclosure, an information processing device includes a processor. The processor is configured to control a vehicle including a storage apparatus including one or more compartments configured such that a user deposits baggage. The processor is configured to, when a predetermined event related to storage of the baggage has occurred in the storage apparatus, restrict deposit of the baggage into the storage apparatus until the vehicle including the storage apparatus moves to a predetermined place where the predetermined event is resolvable.

In the information processing device according to the first aspect of the present disclosure, the processor may be configured to restrict the deposit of the baggage only for a compartment in which the predetermined event has occurred among the one or more compartments.

In the information processing device according to the first aspect of the present disclosure, the processor may be configured to restrict the deposit of the baggage for a compartment in which the predetermined event has occurred and surrounding compartments around the compartment in which the predetermined event has occurred among the one or more compartments. The surrounding compartments may be determined depending on the predetermined event.

In the information processing device according to the first aspect of the present disclosure, the vehicle may include a sensor configured to detect soil of each of the one or more compartments. The processor may be configured to determine that the predetermined event has occurred in a compartment in which a detected value of the sensor is equal to or larger than a predetermined value.

In the information processing device according to the first aspect of the present disclosure, the processor may be configured to determine that the predetermined event has occurred in the compartment in which the detected value of the sensor is equal to or larger than the predetermined value and surrounding compartments around the compartment in which the detected value of the sensor is equal to or larger than the predetermined value. The surrounding compartments around the compartment in which the detected value of the sensor is equal to or larger than the predetermined value may be determined depending on the predetermined event.

In the information processing device according to the first aspect of the present disclosure, the vehicle may include a sensor configured to detect soil of each of the one or more compartments. The processor may be configured to determine that the predetermined event has occurred in a compartment in which a detected value of the sensor is equal to or larger than a first predetermined value. The processor may be configured to generate a command to move the vehicle to the predetermined place when there is a compartment in which the detected value of the sensor is equal to or larger than a second predetermined value. The second predetermined value may be larger than the first predetermined value.

In the information processing device according to the first aspect of the present disclosure, the processor may be configured to determine the predetermined place based on the predetermined event.

The information processing device according to the first aspect of the present disclosure may further include a storage device configured to store a relationship between the predetermined place and the predetermined event.

In the information processing device according to the first aspect of the present disclosure, the processor may be configured to permit, at the predetermined place, unlocking of only a compartment in which the predetermined event has occurred.

In the information processing device according to the first aspect of the present disclosure, the processor may be configured to permit, at the predetermined place, unlocking of a compartment in which the predetermined event has occurred and a compartment in which the predetermined event has not occurred and the baggage is not stored.

In the information processing device according to the first aspect of the present disclosure, the processor may be configured to permit, at the predetermined place, unlocking of a compartment in which unlocking permission is obtained from the user associated with the baggage among compartments in which the baggage is stored.

In the information processing device according to the first aspect of the present disclosure, the processor may be configured to generate a command to move the vehicle to the predetermined place when the number of compartments in which the baggage is not stored among the one or more compartments is smaller than a predetermined value.

In the information processing device according to the first aspect of the present disclosure, the predetermined place may be a car dealer, a car maintenance shop, a gas station, or a home of a registered user.

In the information processing device according to the first aspect of the present disclosure, the processor may be configured to give an incentive to the registered user when the registered user has cleaned the storage apparatus.

In a second aspect of the present disclosure, an information processing method for controlling a vehicle including a storage apparatus including one or more compartments configured such that a user deposits baggage includes restricting, by a computer, when a predetermined event related to storage of the baggage has occurred in the storage apparatus, deposit of the baggage into the storage apparatus until the vehicle including the storage apparatus moves to a predetermined place where the predetermined event is resolvable.

The information processing method according to the second aspect of the present disclosure may further include restricting, by the computer, the deposit of the baggage only for a compartment in which the predetermined event has occurred among the one or more compartments.

The information processing method according to the second aspect of the present disclosure may further include restricting, by the computer, the deposit of the baggage for a compartment in which the predetermined event has occurred and surrounding compartments around the compartment in which the predetermined event has occurred among the one or more compartments. The surrounding compartments may be determined depending on the predetermined event.

The information processing method according to the second aspect of the present disclosure may further include determining, by the computer, that the predetermined event has occurred in a compartment in which a detected value of a sensor configured to detect soil of each of the one or more compartments is equal to or larger than a predetermined value.

The information processing method according to the second aspect of the present disclosure may further include determining, by the computer, that the predetermined event has occurred in the compartment in which the detected value of the sensor is equal to or larger than the predetermined value and surrounding compartments around the compartment in which the detected value of the sensor is equal to or larger than the predetermined value. The surrounding compartments around the compartment in which the detected value of the sensor is equal to or larger than the predetermined value may be determined depending on the predetermined event.

The information processing method according to the second aspect of the present disclosure may further include determining, by the computer, that the predetermined event has occurred in a compartment in which a detected value of a sensor configured to detect soil of each of the one or more compartments is equal to or larger than a first predetermined value, and generating, by the computer, a command to move the vehicle to the predetermined place when there is a compartment in which the detected value of the sensor is equal to or larger than a second predetermined value. The second predetermined value may be larger than the first predetermined value.

Another aspect of the present disclosure relates to a program for causing a computer to execute a process in the information processing device described above, or a non-transitory storage medium storing the program.

With the present disclosure, it is possible to take more appropriate measures when an abnormality occurs in the storage apparatus due to the baggage deposited by the user.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 is a diagram illustrating a table structure of a baggage information DB;

FIG. 7 is a diagram illustrating a table structure of a cleaning place information DB;

FIG. 8 is a diagram showing a functional configuration of the vehicle;

FIG. 9 is a diagram showing a functional configuration of the user terminal;

DETAILED DESCRIPTION OF EMBODIMENTS

Figure 1:
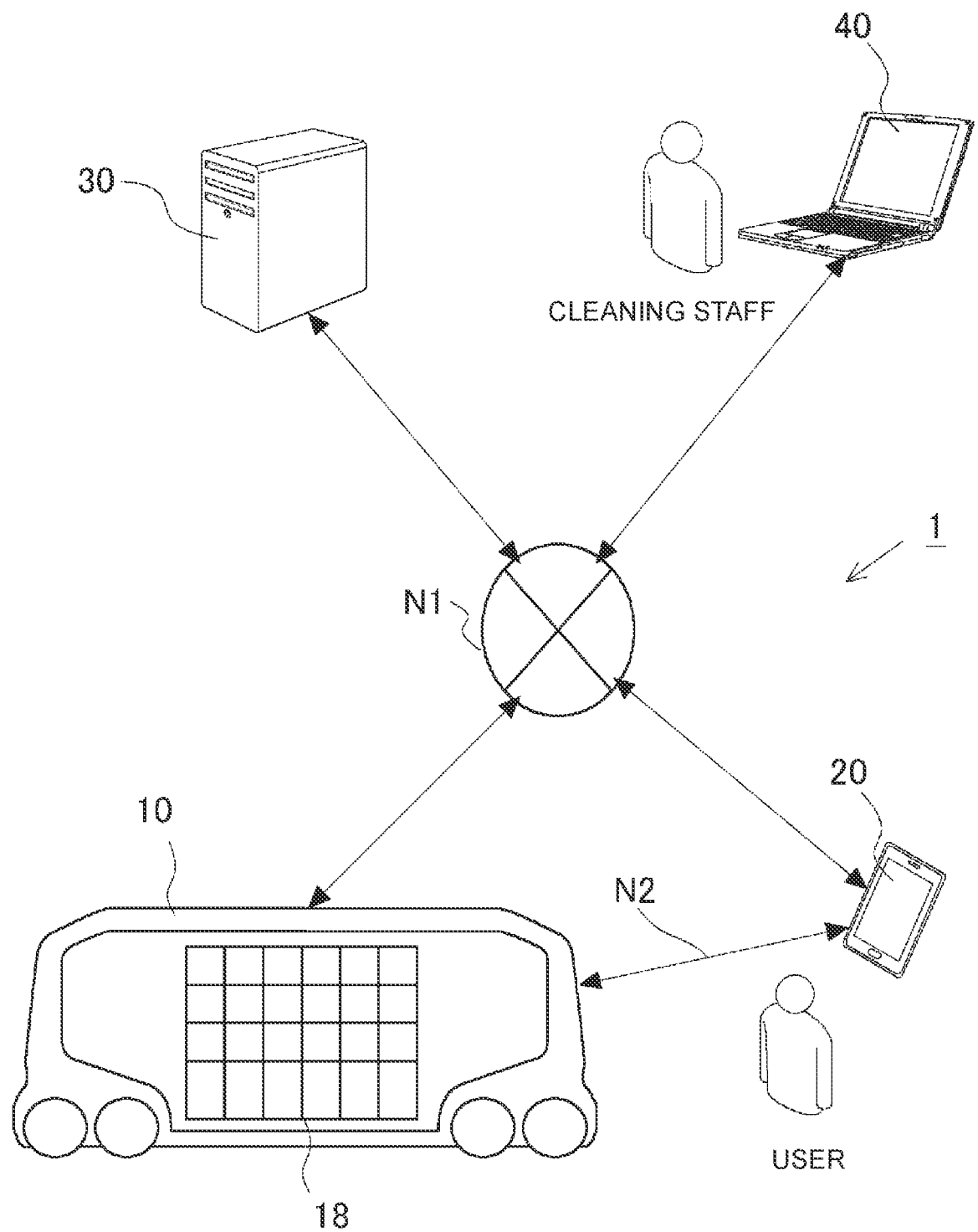
FIG. 1 is a diagram showing a schematic configuration of a system according to an embodiment.

An information processing device according to one aspect of the present disclosure includes a control unit. The control unit controls a vehicle including a storage apparatus including a plurality of compartments in which a user can deposit baggage. Since the storage apparatus is mounted on the vehicle, the storage apparatus moves along with movement of the vehicle. Therefore, the user can call the storage apparatus together with the vehicle when depositing or taking out the baggage. Thus, the user need not travel a long distance when depositing or taking out the baggage. Since the storage apparatus includes the plurality of compartments, it is possible to deposit a plurality of pieces of baggage associated with a plurality of users.

When a predetermined event related to storage of the baggage has occurred in the storage apparatus, the control unit restricts deposit of the baggage into the storage apparatus by the user until the vehicle including the storage apparatus moves to a predetermined place where the predetermined event is resolvable. Examples of the predetermined event include an event that affects the deposited baggage and an event that affects the user who has deposited the baggage. For example, the baggage may be odorous, the baggage may be soiled, the baggage may be wet, the user may have discomfort in the odor, or the user may have discomfort in the soil. The predetermined event can be resolved at the predetermined place. Examples of the predetermined place include a place where the storage apparatus can be cleaned. Since the predetermined event continues until the vehicle moves to the predetermined place, the deposit of the baggage is restricted to reduce the effect on the baggage or the user. The restriction includes prohibition of entry of baggage into a compartment in which the predetermined event has occurred, and prohibition of unlocking of the compartment in which the predetermined event has occurred.

The compartment in which the predetermined event has occurred may affect other compartments. For example, in a compartment storing baggage that generates an odor, the odor may remain in the compartment and may spread to the surrounding compartments. When the entry of baggage into the surrounding compartments is prohibited, it is possible to reduce the occurrence of a case where the odor is transferred to the baggage or the user has discomfort when depositing or taking out the baggage.

When the predetermined event is resolved at the predetermined place, the restriction on the deposit of the baggage is terminated. Therefore, the baggage can be deposited. In this case, the user does not have discomfort because the predetermined event has been resolved.

Hereinafter, embodiments of the present disclosure will be described with reference to the drawings. The configurations of the following embodiments are illustrative, and the present disclosure is not limited to the configurations of the embodiments. The following embodiments can be combined if possible.

First Embodiment

FIG. 1 is a diagram showing a schematic configuration of a system 1 according to an embodiment. In the system 1, users can store baggage in a vehicle 10 including a locker 18. Each user can move the vehicle 10 by calling the vehicle via a server 30. Therefore, the user can deposit the baggage into the locker 18 of the vehicle 10 and take the baggage out of the locker 18 of the vehicle 10 at any locations. The vehicle 10 is, for example, a vehicle capable of autonomous traveling, but may be a vehicle to be driven manually by a driver, or a vehicle on which an administrator who monitors the vehicle 10 or the locker 18 rides.

Figure 2:
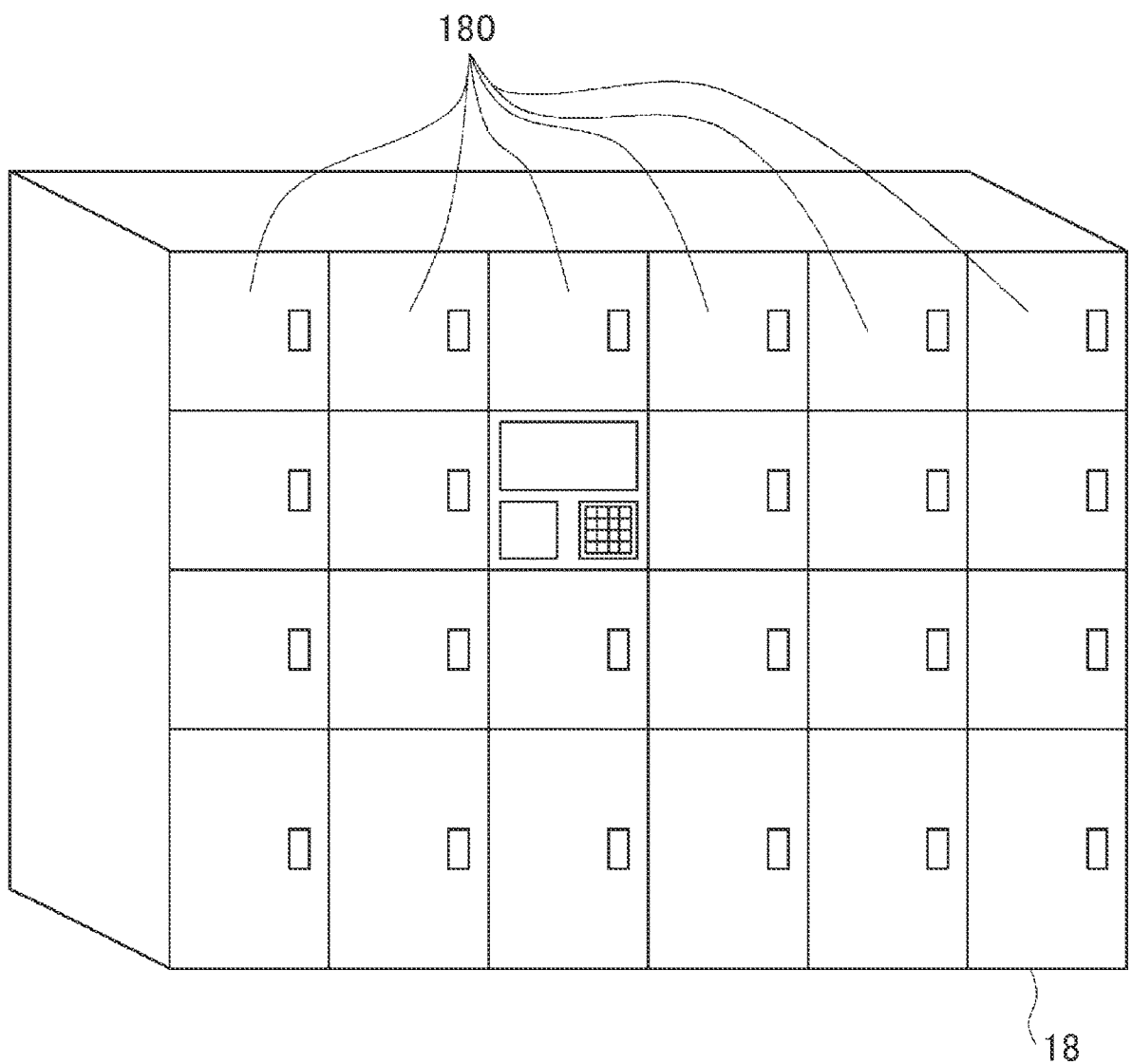
FIG. 2 is a diagram showing the appearance of a locker.

The locker 18 is a device having a plurality of compartments and capable of storing baggage in each compartment. FIG. 2 shows the appearance of the locker 18. As shown in FIG. 2, the locker 18 includes compartment boxes 180 accessible via a plurality of doors. The user of the system 1 can unlock a designated box 180 by using a user terminal 20 or via an interface provided in the locker 18. The locker 18 is mounted in a vehicle cabin of the vehicle 10. The locker 18 is an example of the storage apparatus, and the box 180 is an example of the compartment.

The user terminal 20 is owned by the user. The user can call the vehicle 10 and lock or unlock the locker by executing a predetermined application installed in the user terminal 20.

When the locker 18 is soiled, the server 30 moves the vehicle 10 to a cleaning place and causes a cleaning staff to clean the locker 18. Examples of the cleaning place include a car dealer, a car maintenance shop, a gas station, and a home of a registered user. At the cleaning place, the cleaning staff can unlock a box 180 to be cleaned by using a cleaning place terminal 40 or via the interface provided in the locker 18. The cleaning place terminal 40 is used by the cleaning staff at the cleaning place. The cleaning staff can lock or unlock the locker by executing a predetermined application installed in the cleaning place terminal 40. Examples of the cleaning staff include an employee of a car dealer, an employee of a car maintenance shop, an employee of a gas station, and a registered user.

The server 30 is a device that manages operation of the vehicle 10. When a dispatch request for the vehicle 10 is received from the user terminal 20, the server 30 determines the vehicle 10 to be dispatched to the user and instructs the vehicle 10 to operate.

The vehicle 10, the user terminal 20, the server 30, and the cleaning place terminal 40 are connected to each other via a network N1. The network N1 is a worldwide public communication network such as the Internet, and a wide area network (WAN) or other communication networks may be adopted. The network N1 may include a telephone communication network such as a mobile phone network, or a wireless communication network such as Wi-Fi (registered trademark). The locker 18 is connected to the user terminal 20 and the cleaning place terminal 40 via a network N2 including short-range wireless communication and the like. The network N2 performs data communication by using, for example, Bluetooth (registered trademark) Low Energy, near field communication (NFC), ultra-wideband (UWB), or Wi-Fi (registered trademark).

Figure 3:
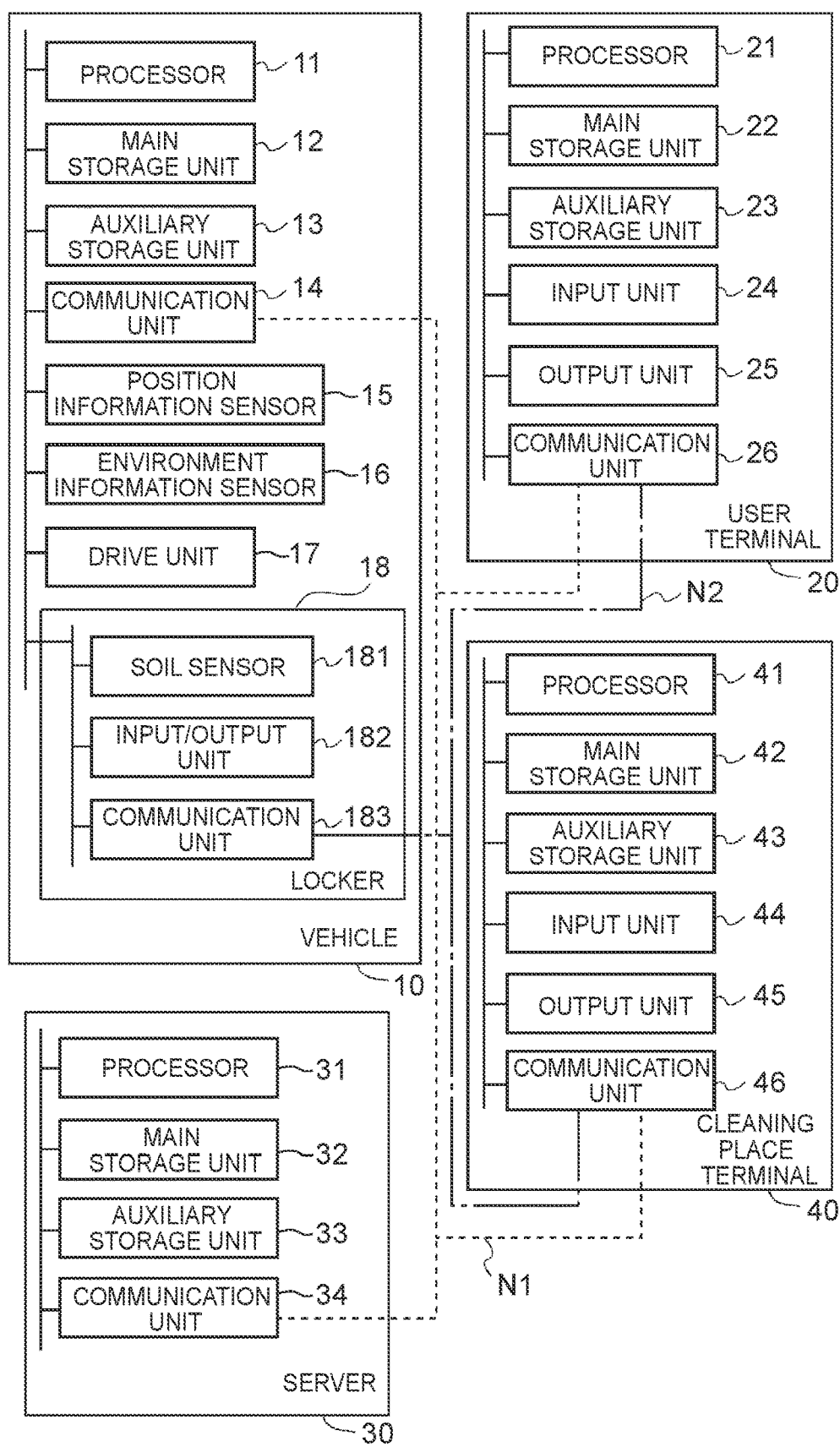
FIG. 3 is a block diagram schematically showing an example of the configurations of a vehicle, a user terminal, a server, and a cleaning place terminal constituting the system according to the embodiment.

The hardware and functional configurations of the vehicle 10, the user terminal 20, the server 30, and the cleaning place terminal 40 will be described with reference to FIG. 3. FIG. 3 is a block diagram schematically showing an example of the configurations of the vehicle 10, the user terminal 20, the server 30, and the cleaning place terminal 40 constituting the system 1 according to the present embodiment.

The server 30 has a computer configuration. The server 30 includes a processor 31, a main storage unit 32, an auxiliary storage unit 33, and a communication unit 34. The processor 31, the main storage unit 32, the auxiliary storage unit 33, and the communication unit 34 are connected to each other by a bus. The processor 31 is an example of a control unit. The main storage unit 32 and the auxiliary storage unit 33 are examples of a storage device.

The processor 31 is a central processing unit (CPU), a digital signal processor (DSP), or the like. The processor 31 controls the server 30 and performs various information processing calculations. The main storage unit 32 is a random access memory (RAM), a read-only memory (ROM), or the like. The auxiliary storage unit 33 is an erasable programmable ROM (EPROM), a hard disk drive (HDD), a removable medium, or the like. The auxiliary storage unit 33 stores an operating system (OS), various programs, various tables, and the like. The processor 31 controls the components and the like by loading the programs stored in the auxiliary storage unit 33 into a work area of the main storage unit 32 and executing the loaded programs. As a result, the server 30 implements functions that meet predetermined purposes. The main storage unit 32 and the auxiliary storage unit 33 are computer-readable recording media. The server 30 may be a single computer or may include a plurality of computers linked together. The information stored in the auxiliary storage unit 33 may be stored in the main storage unit 32. The information stored in the main storage unit 32 may be stored in the auxiliary storage unit 33.

The communication unit 34 communicates with the vehicle 10, the user terminal 20, and the cleaning place terminal 40 via the network N1. The communication unit 34 is, for example, a local area network (LAN) interface board or a wireless communication circuit for wireless communication. The LAN interface board and the wireless communication circuit are connected to the network N1.

The vehicle 10 is, for example, a mobile body capable of traveling autonomously, and includes a computer. The vehicle 10 includes a processor 11, a main storage unit 12, an auxiliary storage unit 13, a communication unit 14, a position information sensor 15, an environment information sensor 16, a drive unit 17, and the locker 18. These components are connected to each other by a bus. The processor 11, the main storage unit 12, and the auxiliary storage unit 13 are similar to the processor 31, the main storage unit 32, and the auxiliary storage unit 33 of the server 30, respectively, and therefore description thereof will be omitted.

The communication unit 14 is communication means for connecting the vehicle 10 to the network N1. The communication unit 14 is a circuit for communicating with other devices (server 30, user terminal 20, and cleaning place terminal 40) via the network N1 by using wireless communication such as a mobile communication service (for example, a telephone communication network such as the fifth generation (5G), the fourth generation (4G), the third generation (3G), and long term evolution (LTE)), Wi-Fi (registered trademark), or Bluetooth (registered trademark).

The position information sensor 15 acquires position information (for example, latitude and longitude) of the vehicle 10 in a predetermined cycle. Examples of the position information sensor 15 include a global positioning system (GPS) receiving unit and a wireless communication unit. The information acquired by the position information sensor 15 is recorded in, for example, the auxiliary storage unit 13 and transmitted to the server 30.

The environment information sensor 16 senses the state of the vehicle 10 or the periphery of the vehicle 10. Examples of the sensor for sensing the state of the vehicle 10 include a gyroscope sensor, an acceleration sensor, and an azimuth sensor. Examples of the sensor for sensing the periphery of the vehicle 10 include a stereo camera, a laser scanner, a light detection and ranging (LIDAR) sensor, and a radar.

The drive unit 17 is a device for causing the vehicle 10 to travel based on a control command generated by the processor 11. The drive unit 17 includes, for example, a plurality of motors for driving rotors in the vehicle 10. The drive unit 17 realizes autonomous traveling of the vehicle 10 by driving the motors in response to the control command.

The locker 18 is a device for storing user's baggage. The locker 18 includes the boxes 180 for storing the user's baggage. Each box 180 includes a soil sensor 181 for detecting an internal odor or soil. The locker 18 includes an input/output unit 182 and a communication unit 183. The soil sensor 181, the input/output unit 182, and the communication unit 183 are connected to, for example, the processor 11 of the vehicle 10 by a bus.

The soil sensor 181 includes one or more sensors out of a sensor capable of detecting an odor component, a sensor capable of detecting soil, and a sensor capable of detecting a liquid. Examples of the sensor capable of detecting an odor component include an odor sensor capable of detecting the intensity of an odor. Examples of the sensor capable of detecting soil include a sensor including a camera (image sensor), such as a sensor that detects the degree of soil based on captured image data. Examples of the sensor capable of detecting a liquid include a liquid leakage sensor that detects a liquid by detecting a change in light transmittance or reflectance, and a liquid leakage sensor that detects a liquid by detecting a change in electrical resistance. A plurality of these sensors can be used in combination. Alternatively, the soil sensor 181 may be a sensor that detects a liquid in a spillable state. For example, a gyroscope sensor may be adopted as the soil sensor 181 to detect a liquid when the detected value of the gyroscope sensor indicates that the liquid is spillable.

The input/output unit 182 receives an input operation performed by the user and presents information to the user. In the present embodiment, the input/output unit 182 is a single touch panel display. The input/output unit 182 may further have means for exchanging authentication information with the user terminal 20. For example, the input/output unit 182 may include a camera for reading a two-dimensional bar code.

The communication unit 183 is communication means for connecting the locker 18 to the network N2. The communication unit 183 is a circuit for communicating with other devices (for example, the user terminal 20 or the cleaning place terminal 40) via the network N2 by using a wireless communication network such as Bluetooth (registered trademark) Low Energy, near field communication (NFC), ultra-wideband (UWB), or Wi-Fi (registered trademark).

Next, the user terminal 20 will be described. The user terminal 20 is a small computer such as a smartphone, a mobile phone, a tablet terminal, a personal information terminal, a wearable computer (smart watch, for example), or a personal computer (PC). The user terminal 20 includes a processor 21, a main storage unit 22, an auxiliary storage unit 23, an input unit 24, an output unit 25, and a communication unit 26. These components are connected to each other by a bus. The processor 21, the main storage unit 22, and the auxiliary storage unit 23 are similar to the processor 31, the main storage unit 32, and the auxiliary storage unit 33 of the server 30, respectively, and therefore description thereof will be omitted.

The input unit 24 is means for receiving an input operation performed by the user. Examples of the input unit 24 include a touch panel, a mouse, a keyboard, and a push button. The output unit 25 is means for presenting information to the user. Examples of the output unit 25 include a liquid crystal display (LCD) and an electroluminescence (EL) panel. The output unit 25 may be a display. The input unit 24 and the output unit 25 may be provided as a single touch panel display.

The communication unit 26 is communication means for connecting the user terminal 20 to the network N1 or the network N2. The communication unit 26 is a circuit for communicating with other devices (for example, the vehicle 10, the locker 18, or the server 30) via the network N1 or the network N2 by using a wireless communication network such as a mobile communication service (for example, a telephone communication network such as the fifth generation (5G), the fourth generation (4G), the third generation (3G), and long term evolution (LTE)), Wi-Fi (registered trademark), Bluetooth (registered trademark) Low Energy, near field communication (NFC), or ultra-wideband (UWB).

Next, the cleaning place terminal 40 will be described. The cleaning place terminal 40 is a small computer such as a smartphone, a mobile phone, a tablet terminal, a personal information terminal, a wearable computer (smart watch, for example), or a personal computer (PC). The cleaning place terminal 40 includes a processor 41, a main storage unit 42, an auxiliary storage unit 43, an input unit 44, an output unit 45, and a communication unit 46. These components are connected to each other by a bus. These components are similar to the processor 21, the main storage unit 22, the auxiliary storage unit 23, the input unit 24, the output unit 25, and the communication unit 26 of the user terminal 20, and therefore description thereof will be omitted.

Figures 4, 5:
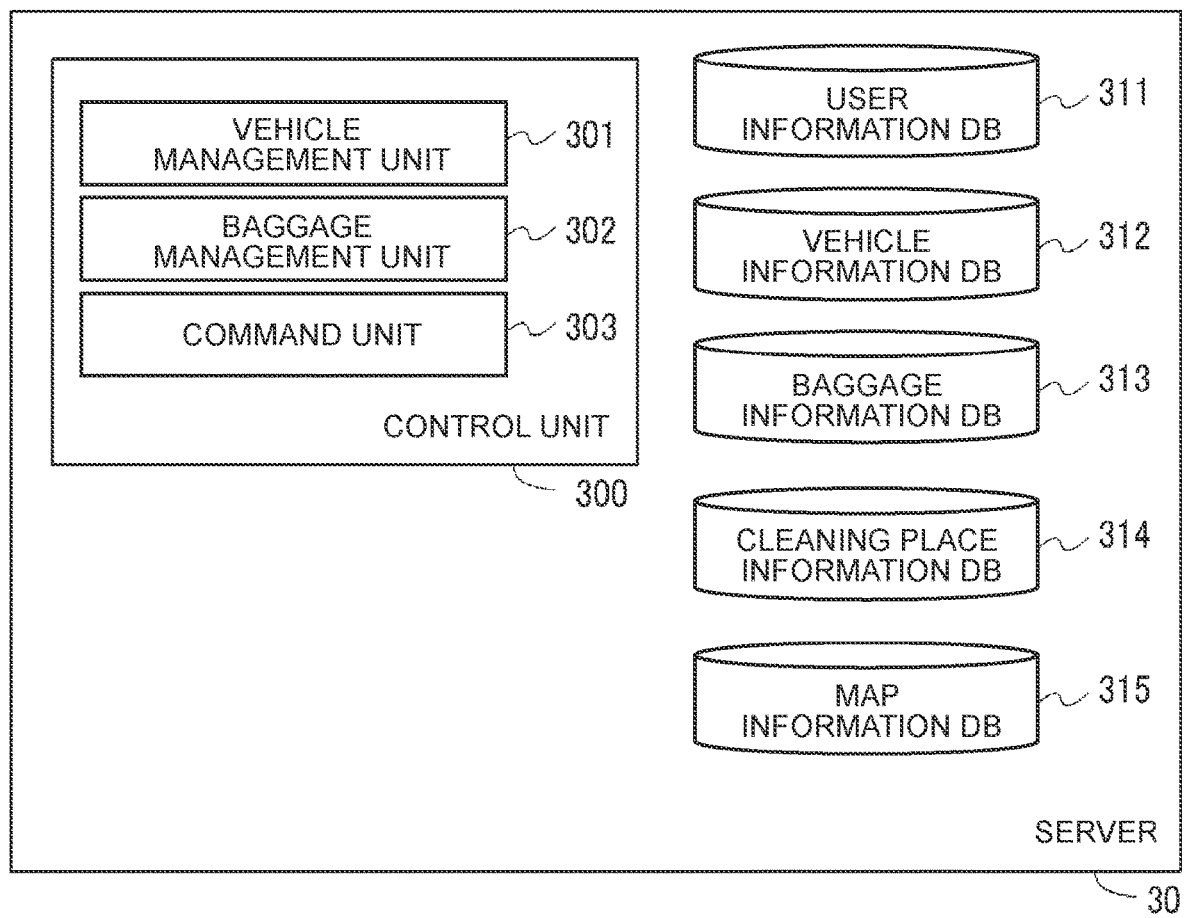
FIG. 4 is a diagram illustrating a functional configuration of the server.
FIG. 5 is a diagram illustrating a table structure of a vehicle information database (DB)

Next, functions of the server 30 will be described. FIG. 4 is a diagram illustrating a functional configuration of the server 30. The server 30 includes a control unit 300, a user information DB 311, a vehicle information DB 312, a baggage information DB 313, a cleaning place information DB 314, and a map information DB 315 as functional components. The processor 31 of the server 30 executes processes of the control unit 300 by using a computer program stored in the main storage unit 32. Any of the functional components or a part of the processes thereof may be executed by a hardware circuit. The control unit 300 includes a vehicle management unit 301, a baggage management unit 302, and a command unit 303.

The user information DB 311, the vehicle information DB 312, the baggage information DB 313, the cleaning place information DB 314, and the map information DB 315 are constructed such that a program of a database management system (DBMS) that is executed by the processor 31 manages data stored in the auxiliary storage unit 33. The user information DB 311, the vehicle information DB 312, the baggage information DB 313, the cleaning place information DB 314, and the map information DB 315 are, for example, relational databases.

Any of the functional components of the server 30 or a part of the processes thereof may be executed by another computer connected to the network N1.

The vehicle management unit 301 collects information related to the vehicle 10 and updates the vehicle information DB 312 described later. Specifically, the vehicle management unit 301 periodically communicates with a plurality of vehicles 10 and collects information related to the vehicles 10 (hereinafter referred to also as "vehicle information"). The collected information is reflected in the vehicle information DB 312 described later.

The baggage management unit 302 acquires a deposit request from a user who desires to deposit baggage. The deposit request is information for calling the vehicle 10 to deposit the baggage at a location desired by the user. The deposit request is transmitted from the user terminal 20 to the server 30. The deposit request includes information related to a user identifier (ID), a deposit location, a deposit date, a baggage size, and the like. The user ID is an identifier unique to the user. User information (for example, name, address, telephone number, and e-mail address) associated with the user ID may be preregistered by the user by using the user terminal 20, or may be transmitted from the user terminal 20 together with the deposit request. The user information is stored in the user information DB 311. The user information DB 311 is constructed by storing the user information in the auxiliary storage unit 33, and the user is associated with the user information. The deposit location is a location where the user desires to deposit the baggage into the locker 18 of the vehicle 10. The deposit location is represented by, for example, coordinates (latitude and longitude), an address, or the name of a building. The deposit date is a date when the user desires to deposit the baggage into the locker of the vehicle 10. The deposit date may be specified as a time frame having a certain range.

The baggage management unit 302 acquires a takeout request from a user who desires to take out baggage. The takeout request is information for calling the vehicle 10 storing the baggage at a location desired by the user for the purpose of taking out the baggage. The takeout request is transmitted from the user terminal 20 to the server 30. The takeout request includes information related to a user ID, a takeout location, a takeout date, and the like. The takeout location is a location where the user desires to take the baggage out of the locker 18 of the vehicle 10, and is represented by, for example, coordinates (latitude and longitude), an address, or the name of a building. The takeout date is a date when the user desires to take the baggage out of the locker 18 of the vehicle 10. The takeout date may be specified as a time frame having a certain range. The takeout request may be transmitted from the user terminal 20 simultaneously with the deposit request, or may be transmitted from the user terminal 20 after the deposit request.

The baggage management unit 302 stores the information in the deposit request and the information in the takeout request in the baggage information DB 313 described later.

When the deposit request or the takeout request is received, the command unit 303 determines a location where the baggage will be deposited or taken out (that is, a location to which the vehicle 10 will be dispatched; hereinafter referred to as "dispatch location") and a date of the dispatch (hereinafter referred to as "dispatch date"), and generates an operation command to operate the vehicle 10. The operation command includes, for example, a route of the vehicle 10. The command unit 303 generates the route based on map information stored in the map information DB 315. For example, the command unit 303 generates the operation command to cause the vehicle 10 to depart from a current location and travel through each dispatch location on each dispatch date. The operation command includes a command to receive the baggage from the user at each dispatch location, or a command to deliver the baggage to the user at each dispatch location.

For example, when the deposit request is received from the user, the command unit 303 selects a dispatchable vehicle 10 based on the information in the deposit request, such as a deposit location, a deposit date, and a baggage size. The dispatchable vehicle 10 is a vehicle having an available box 180 that can store baggage in the corresponding size and movable to the deposit location on the deposit date. For example, a vehicle having a reservation to deposit or take out baggage at another location on the same date does not correspond to the vehicle 10 movable to the deposit location on the deposit date. Therefore, the command unit 303 selects the vehicle 10 based on dispatch locations and dispatch dates associated with other pieces of baggage. When there is no vehicle 10 dispatchable on the deposit date desired by the user, the server 30 may notify the user terminal 20 that the baggage cannot be deposited. At this time, the server 30 may notify the user terminal 20 about a date when the baggage can be deposited at the deposit location.

In the above description, the deposit date is included in the deposit request, but is not limited to this case. The deposit date may be presented to the user from the server 30. For example, when the server 30 acquires the deposit location, the server 30 may acquire a date when the baggage can be deposited based on reservation statuses of the boxes 180, and notify the user terminal 20 about the date when the baggage can be deposited. If there is a plurality of dates when the baggage can be deposited, the server 30 may present, to the user, the dates when the baggage can be deposited. By presenting, to the user, the dates when the baggage can be deposited, the server 30 allows the user to select any date from among the dates when the baggage can be deposited. Similarly, the deposit location may be presented to the user from the server 30 instead of the case where the deposit location is included in the deposit request. Alternatively, the server 30 may present the deposit location and the deposit date to the user.

For example, when the takeout request is received from the user, the command unit 303 selects a vehicle 10 to be dispatched based on the information in the takeout request, such as a user ID, a takeout location, and a takeout date. The vehicle 10 to be dispatched at this time is a vehicle storing the baggage deposited by the user. Therefore, the command unit 303 identifies the vehicle 10 storing the baggage deposited by the user based on the user ID. The command unit 303 determines whether the vehicle 10 can be dispatched to the takeout location on the takeout date based on the takeout location and the takeout date in the takeout request. When the vehicle 10 cannot be dispatched on the takeout date desired by the user, the server 30 may notify the user terminal 20 that the baggage cannot be delivered at the takeout location on the takeout date. At this time, the server 30 may notify the user terminal 20 about a date when the baggage can be delivered at the takeout location.

In the above description, the takeout date is included in the takeout request, but is not limited to this case. The takeout date may be presented to the user from the server 30. For example, when the server 30 acquires the takeout location, the server 30 may acquire a date when the baggage can be taken out based on reservation statuses of the boxes 180, and notify the user terminal 20 about the date when the baggage can be taken out. If there is a plurality of dates when the baggage can be taken out, the server 30 may present, to the user, the dates when the baggage can be taken out. By presenting, to the user, the dates when the baggage can be taken out, the server 30 allows the user to select any date from among the dates when the baggage can be taken out. Similarly, the takeout location may be presented to the user from the server 30 instead of the case where the takeout location is included in the takeout request. Alternatively, the server 30 may present the takeout location and the takeout date to the user.

The baggage management unit 302 acquires a detected value of each soil sensor 181 from the vehicle 10. For example, the detected value of the soil sensor 181 is included in the vehicle information periodically transmitted from the vehicle 10. When the detected value of any soil sensor 181 indicates that cleaning is necessary, the baggage management unit 302 transmits a command to the vehicle 10 to prohibit the use of a part of the boxes 180. For example, the baggage management unit 302 divides the detected value of the soil sensor 181 into three soil levels and executes processes based on the respective levels. For example, the three levels may include a first level at which cleaning is not necessary, a second level at which cleaning is necessary but may be carried out at any available time, and a third level at which cleaning needs to be carried out immediately. The number of levels to be divided is not limited to three, and may be two, four, or more.

The second level may be a level at which simple cleaning suffices. Examples of the simple cleaning include cleaning that can be completed in a period shorter than a predetermined period, and cleaning to be carried out by using a household cleaning tool. If the cleaning requires a period equal to or longer than the predetermined period, the level may be the third level. The third level may be a level at which special cleaning is necessary. For example, when the detected value of the soil sensor 181 is smaller than a first threshold, the soil level may be set to the first level. When the detected value is equal to or larger than the first threshold and smaller than a second threshold, the soil level may be set to the second level. When the detected value is equal to or larger than the second threshold, the soil level may be set to the third level. That is, the level may be set under the assumption that a longer period is required for cleaning as the detected value of the soil sensor 181 increases.

For example, when an odor is detected by the soil sensor 181 and corresponds to the first level, the baggage management unit 302 takes no particular action. When the odor corresponds to the second level, the baggage management unit 302 prohibits the use of the corresponding box 180. In this case, the baggage management unit 302 prohibits the use of the corresponding box 180 until the cleaning of the corresponding box 180 is completed. In this case, the cleaning may be carried out at the time of maintenance of the vehicle 10 or the locker 18. When the odor corresponds to the third level, the baggage management unit 302 may prohibit the use of not only the corresponding box 180 but also the surrounding boxes 180. If the odor spreads to another box 180, a user who uses the other box 180 may have discomfort. Further, the odor may be transferred to baggage deposited in the surrounding boxes 180. By prohibiting the use of not only the corresponding box 180 but also the surrounding boxes 180, the baggage management unit 302 suppresses the user's discomfort or the transfer of the odor to the baggage. Examples of the surrounding boxes 180 include the upper, lower, right, and left boxes 180 around the corresponding box 180, and the right and left boxes 180 around the upper and lower boxes 180. Therefore, the use of a total of nine boxes 180 may be prohibited at the third level.

When a liquid is detected by the soil sensor 181, the first threshold and the second threshold may be set so that the soil level corresponds to at least the second level or the third level. The first threshold may be set to a value at which the liquid does not flow out of the corresponding box 180. The second threshold may be set to a value at which the liquid may flow out of the corresponding box 180. For example, at the third level, the liquid may flow to the boxes 180 around the corresponding box 180. Therefore, the baggage management unit 302 prohibits the use of the surrounding boxes 180. At this time, the liquid flows laterally or downward, but does not flow upward. Therefore, the baggage management unit 302 may prohibit the use of the right, left, and lower boxes 180 around the corresponding box 180 and the right and left boxes 180 around the lower box 180.

When soil is detected by the soil sensor 181 and cannot be removed immediately, the baggage management unit 302 may determine that the soil level is the third level. The type or degree of the soil is determined by, for example, image processing. If the soil does not affect the surrounding boxes 180, the second threshold may be set so that the soil level corresponds to the second level even though the degree of the soil is high.

The prohibition of the use of the corresponding box 180 continues until cleaning is completed. The cleaning may be carried out not only for the corresponding box 180 but also for the surrounding boxes 180. Particularly when the soil level is the third level, the surrounding boxes 180 may be soiled as well. Therefore, the surrounding boxes 180 may be cleaned together with the corresponding box 180. Alternatively, determination may be made as to whether to clean the surrounding boxes 180 based on the detected values of the soil sensors 181 of the surrounding boxes 180. For example, cleaning is not necessary when a box 180 is located around the box 180 having the third soil level but the detected value of the soil sensor 181 is smaller than the first threshold.

The baggage management unit 302 stores, in the baggage information DB 313 described later, information on the soil levels associated with the boxes 180 and the availability of the boxes 180.

Next, the structure of the vehicle information stored in the vehicle information DB 312 will be described with reference to FIG. 5. FIG. 5 is a diagram illustrating a table structure of the vehicle information DB 312. A vehicle information table includes fields for a vehicle ID, a current location, a status, and a route. Information for identifying a vehicle (vehicle ID) is input in the vehicle ID field. The vehicle ID is given to each vehicle by, for example, the vehicle management unit 301. Information related to a current location of the vehicle 10 (position information) is input in the current location field. The current location of the vehicle 10 is detected by the position information sensor 15 of the vehicle 10 and transmitted from the vehicle 10 to the server 30.

The status field stores data indicating a current state of the vehicle 10. Specifically, information related to the remaining battery level or the mileage of the vehicle 10 is stored. Information related to a route of the vehicle 10 is input in the route field.

Next, the structure of the baggage information stored in the baggage information DB 313 will be described with reference to FIG. 6. FIG. 6 is a diagram illustrating a table structure of the baggage information DB 313. A baggage information table includes fields for a vehicle ID, a box number, a user ID, a deposit location, a deposit date, a takeout location, a takeout date, a level, and an availability. Information for identifying a vehicle (vehicle ID) is input in the vehicle ID field. Information for identifying a box 180 (box number) is input in the box number field. Information for identifying a user (user ID) is input in the user ID field.

Information related to a location where the user will deposit baggage is input in the deposit location field. Information related to a location that may be a destination of the vehicle 10 when the user will deposit the baggage into the locker 18 of the vehicle 10, such as coordinates, an address, or the name of a building, is input in the deposit location field. Information related to a date when the user will deposit the baggage is input in the deposit date field. Information related to a location where the user will take out the baggage is input in the takeout location field. Information related to a location that may be a destination of the vehicle 10 when the user will take the baggage out of the locker 18 of the vehicle 10, such as coordinates, an address, or the name of a building, is input in the takeout location field. Information related to a date when the user will take out the baggage is input in the takeout date field.

Information related to a soil level is input in the level field. For example, when the soil level is the first level, "1" is input in the level field. When the soil level is the second level, "2" is input in the level field. When the soil level is the third level, "3" is input in the level field. Information as to whether the box 180 is available is input in the availability field. A value "Yes" is input for an available box 180, and a value "No" is input for an unavailable box 180. For example, the value "No" is input in the availability field for a box 180 whose soil level is the second or third level because its use is prohibited. When the use of the boxes 180 around the box 180 at the third level is also prohibited, the value "No" is input in the availability field. The baggage information table may also include a size field. Information related to the size of the baggage is input in the size field. For example, the size may be represented by length, width, and depth dimensions, or by predefined indicators such as "large", "medium", and "small".

Next, the structure of the cleaning place information stored in the cleaning place information DB 314 will be described with reference to FIG. 7. FIG. 7 is a diagram illustrating a table structure of the cleaning place information DB 314. A cleaning place information table includes fields for a cleaning place ID, a location, an available period, and a handleable level. Information for identifying a cleaning place (cleaning place ID) is input in the cleaning place ID field. The cleaning place ID is given to each cleaning place by, for example, the baggage management unit 302. Information related to a location of the cleaning place is input in the location field. The location of the cleaning place is represented by, for example, coordinates or an address. A day of week and a period during which cleaning can be carried out for the vehicle 10 is input in the available period field. Information related to a handleable level is input in the handleable level field. For example, "2" is input when the second level can be handled, and "3" is input when the third level can be handled. The cleaning place that can handle the third level can also handle the second level. The information input to the cleaning place information DB 314 is transmitted from the cleaning place terminal 40 to the server 30 in advance by the cleaning staff.

For example, the map information DB 315 stores, as map information, link data related to roads (links), node data related to nodes, intersection data related to intersections, search data for use in searching for routes, facility data related to facilities, and search data for use in searching for locations. The map information DB 315 may store information related to speed limits or the like associated with the roads, or information related to attributes of the roads.

Next, functions of the vehicle 10 will be described. FIG. 8 is a diagram showing a functional configuration of the vehicle 10. The vehicle 10 includes a traveling unit 101 and a locker management unit 102 as functional components. The processor 11 of the vehicle 10 executes processes of the traveling unit 101 and the locker management unit 102 by using a computer program on the main storage unit 12. Any of the functional components or a part of the processes thereof may be executed by a hardware circuit. Any of the functional components of the vehicle 10 or a part of the processes thereof may be executed by another computer connected to the network N1.

The traveling unit 101 controls the traveling of the vehicle 10 while the vehicle 10 is traveling autonomously. The traveling unit 101 generates a control command to control the drive unit 17 by using data detected by the environment information sensor 16. The traveling unit 101 controls, for example, the speed and the steering angle of the vehicle 10 by controlling the motors to generate a difference in rotational speeds of the rotors.

For example, the traveling unit 101 generates a traveling trajectory of the vehicle 10 based on the data detected by the environment information sensor 16, and controls the drive unit 17 so that the vehicle 10 travels along the traveling trajectory. A known method can be adopted as a method for causing the vehicle 10 to travel autonomously. The traveling unit 101 may perform feedback control based on the detected value of the environment information sensor 16 during the autonomous traveling. The traveling unit 101 performs the autonomous traveling along a predetermined route. This route is included in the operation command transmitted from the server 30.

For example, the traveling unit 101 causes the vehicle 10 to travel based on a traveling route and a destination included in the operation command received from the server 30. When a deposit request or a takeout request is received, a dispatch location is set as the destination. The traveling unit 101 causes the vehicle 10 to stop at the dispatch location in order that the user can deposit or take out baggage.

The traveling unit 101 periodically transmits information related to the vehicle 10 to the server 30. The traveling unit 101 transmits information related to a current location acquired by the position information sensor 15 and related to the remaining battery level to the server 30 as the information related to the vehicle 10.

The locker management unit 102 authenticates the user terminal 20 of a user who will deposit or take out baggage, authenticates the cleaning place terminal 40 of a cleaning staff who will carry out cleaning, and locks or unlocks the boxes 180. The locker management unit 102 acquires authentication information of the user terminal 20 or the cleaning place terminal 40 from the server 30 via the network N1. The locker management unit 102 establishes communication with the user terminal 20 or the cleaning place terminal 40 via the network N2 to authenticate the user terminal 20 or the cleaning place terminal 40. For example, when the authentication information acquired from the server 30 agrees with the authentication information acquired from the user terminal 20 or the cleaning place terminal 40, the authentication of the user terminal 20 or the cleaning place terminal 40 is successful.

When the authentication of the user terminal 20 is successful, the locker management unit 102 unlocks and opens the door of a box 180 adapted to a baggage size input by the user. When the user closes the door of the box 180, the locker management unit 102 locks the box 180 and notifies the server 30 that the user has deposited the baggage. Alternatively, the user may be authenticated based on information input to the input/output unit 182 by the user. For example, the authentication is successful when a password input to the input/output unit 182 by the user agrees with a password acquired from the server 30. The password may be determined by the server 30. Alternatively, the password input to the user terminal 20 by the user may be transmitted from the user terminal 20 to the server 30.

Similarly in the case of taking out the baggage, the locker management unit 102 acquires the authentication information of the user terminal 20 from the server 30 via the network N1. The locker management unit 102 establishes communication with the user terminal 20 via the network N2 to authenticate the user. For example, when the authentication information acquired from the server 30 agrees with the authentication information acquired from the user terminal 20, the authentication of the user is successful. When the authentication of the user is successful, the locker management unit 102 unlocks and opens the door of the box 180 storing the baggage deposited by the user. The number of the box storing the baggage deposited by the user may be acquired from the server 30. Alternatively, when the user deposits the baggage, the number of the box storing the baggage deposited by the user may be stored in the auxiliary storage unit 13 of the vehicle 10.

When the authentication of the cleaning place terminal 40 is successful, the locker management unit 102 unlocks and opens the door of a box 180 that needs to be cleaned. The box 180 that needs to be cleaned is specified by the server 30. When the cleaning staff closes the door of the box 180, the locker management unit 102 locks the box 180 and notifies the server 30 that the cleaning is completed. Alternatively, the cleaning staff may be authenticated based on information input to the input/output unit 182 by the cleaning staff. For example, the authentication is successful when a password input to the input/output unit 182 by the cleaning staff agrees with a password acquired from the server 30. The password may be determined by the server 30. Alternatively, the password input to the cleaning place terminal 40 by the cleaning staff may be transmitted from the cleaning place terminal 40 to the server 30.

The locker management unit 102 periodically transmits the detected values of the soil sensors 181 to the server 30 via the network N1. As a result of detection by the soil sensors 181, the use of a predetermined box 180 may be prohibited. Even in that case, the locker management unit 102 restricts the unlocking of the box 180 prohibited from its use, for example, based on a command from the server 30. In the cleaning place, the server 30 permits the unlocking of the box 180 prohibited from its use. Since the number of the box 180 that will store baggage deposited by the user is managed by the server 30, the server 30 performs management so that the user does not deposit the baggage into the box 180 prohibited from its use. Therefore, the user terminal 20 cannot unlock the box 180 prohibited from its use, but the cleaning place terminal 40 can unlock the box 180 prohibited from its use.

Next, functions of the user terminal 20 will be described. FIG. 9 is a diagram showing a functional configuration of the user terminal 20. The user terminal 20 includes a locker use unit 201 as a functional component. The processor 21 of the user terminal 20 executes processes of the locker use unit 201 by using a computer program on the main storage unit 22. A part of the processes of the locker use unit 201 may be executed by a hardware circuit. A part of the processes of the locker use unit 201 may be executed by another computer connected to the network N1.

The locker use unit 201 generates a deposit request and a takeout request based on an input to the input unit 24 of the user terminal 20. The locker use unit 201 causes the output unit 25 to display a screen for using the locker 18. For example, the screen shows buttons together with words "deposit" and "takeout".

When the user taps the "deposit" button, the locker use unit 201 prompts the user to input the user information. Once the user information is input, the information may be stored in the auxiliary storage unit 23, and then the locker 18 may be used simply by, for example, inputting the password. The user inputs a deposit location, a deposit date, an address, a name, a telephone number, an e-mail address, and the like via the input unit 24. When the user has completed the input, the locker use unit 201 generates a deposit request and transmits the deposit request to the server 30 via the network N1.

When the user taps the "takeout" button, the locker use unit 201 prompts the user to input a takeout location, a takeout date, and the like. When the user has completed the input via the input unit 24, the locker use unit 201 generates a takeout request and transmits the takeout request to the server 30 via the network N1.

When the locker use unit 201 transmits the deposit request and the takeout request, the locker use unit 201 may receive information related to the baggage deposit or takeout from the server 30. For example, the server 30 transmits information indicating that the baggage can be deposited or taken out under the conditions transmitted by the user terminal 20, or information indicating that the baggage cannot be deposited or taken out under the conditions transmitted by the user terminal 20. The locker use unit 201 causes the output unit 25 to display a screen based on the information.

When the user deposits the baggage into the locker 18 or when the user takes the baggage out of the locker 18, the locker use unit 201 establishes communication with the communication unit 183 of the locker 18 and transmits information related to the user to the locker 18. Thus, the user terminal 20 is used as a key for unlocking the box 180 of the locker 18.

Figure 10:
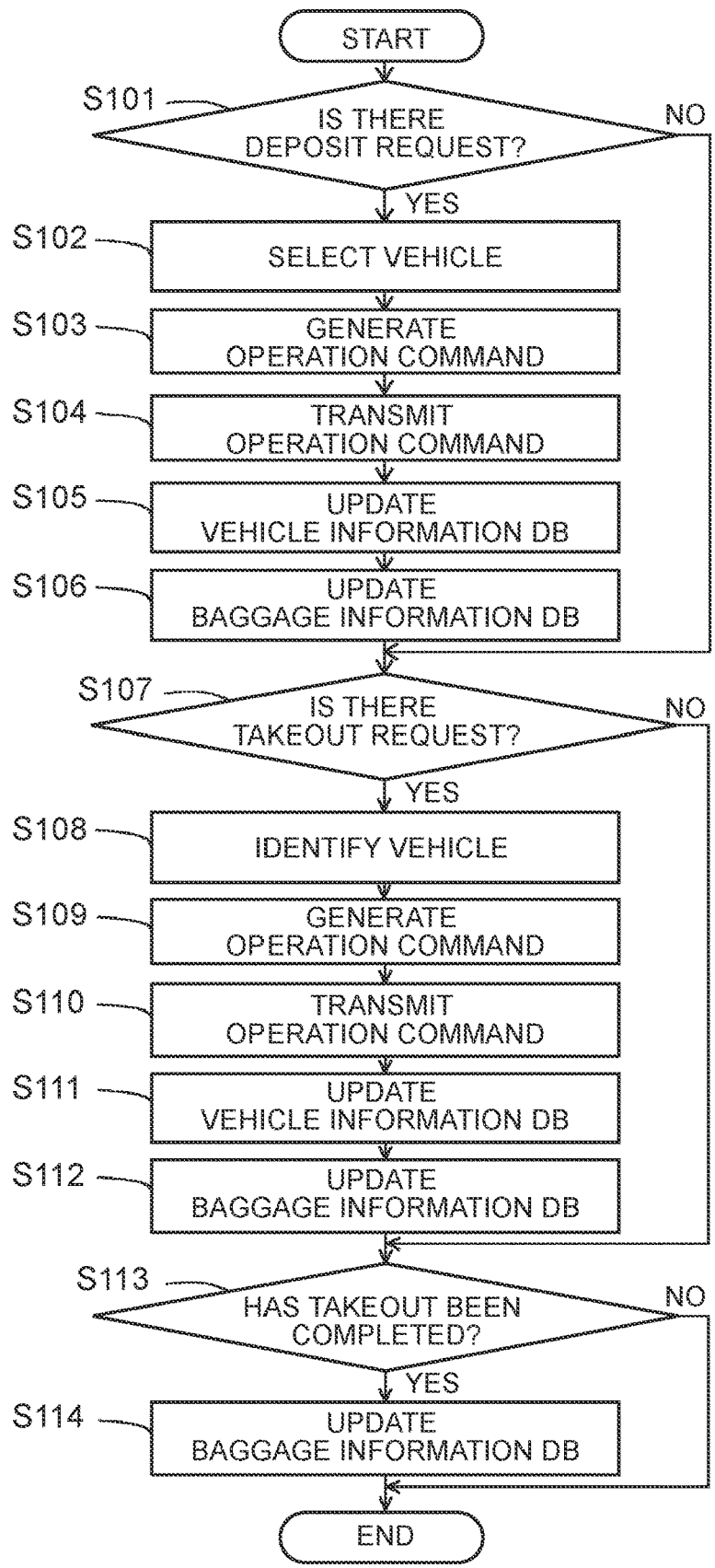
FIG. 10 is a flowchart of a baggage deposit and takeout process in the server according to a first embodiment.

Next, a baggage deposit and takeout process in the server 30 will be described. FIG. 10 is a flowchart of the baggage deposit and takeout process in the server 30 according to the present embodiment. The process shown in FIG. 10 is executed in the server 30 at predetermined time intervals. The description will be given under the assumption that the user information is prestored in the user information DB 311.

In Step S101, the baggage management unit 302 determines whether a deposit request is received from the user terminal 20. When the determination result is "Yes" in Step S101, the process proceeds to Step S102. When the determination result is "No" in Step S101, the process proceeds to Step S107. In Step S102, the baggage management unit 302 selects a vehicle 10 to deposit the user's baggage. The baggage management unit 302 selects, based on information included in the deposit request and information stored in the baggage information DB 313, a vehicle 10 movable to a deposit location on a deposit date and having an available box 180 adapted to the size of the user's baggage.

In Step S103, the command unit 303 generates an operation command to cause the vehicle 10 to depart from a current location and travel through the deposit location on the deposit date. The command unit 303 generates the operation command to authenticate the user terminal 20 at the deposit location and receive the baggage from the user. In Step S104, the command unit 303 transmits the operation command to the vehicle 10. In Step S105, the command unit 303 updates the vehicle information DB 312. That is, a new route is input in the route field.

In Step S106, the baggage management unit 302 updates the baggage information DB 313. That is, the baggage management unit 302 inputs information related to the user ID, the size, the deposit location, and the deposit date into the baggage information DB 313.

In Step S107, the baggage management unit 302 determines whether a takeout request is received from the user terminal 20. When the determination result is "Yes" in Step S107, the process proceeds to Step S108. When the determination result is "No" in Step S107, the process proceeds to Step S113. In Step S108, the baggage management unit 302 identifies the vehicle 10 storing the user's baggage. The baggage management unit 302 identifies the vehicle 10 storing the baggage whose user ID has a match based on information included in the takeout request and the information stored in the baggage information DB 313.

In Step S109, the command unit 303 generates an operation command to cause the vehicle 10 to depart from a current location and travel through a takeout location on a takeout date. The command unit 303 generates the operation command to authenticate the user terminal 20 at the takeout location and deliver the baggage to the user. In Step S110, the command unit 303 transmits the operation command to the vehicle 10. In Step S111, the command unit 303 updates the vehicle information DB 312. That is, a new route is input in the route field.

In Step S112, the baggage management unit 302 updates the baggage information DB 313. That is, the baggage management unit 302 inputs the takeout location and the takeout date into the baggage information DB 313.

In Step S113, the baggage management unit 302 determines whether the user has completed taking out the baggage. For example, when the baggage takeout is completed, information including the vehicle ID, the box number, and the user ID is transmitted from the vehicle 10 to the server 30. When this information is received, determination is made that the reception of the baggage is completed. When the determination result is "Yes" in Step S113, the process proceeds to Step S114. When the determination result is "No" in Step S113, this routine is terminated. In Step S114, the baggage management unit 302 updates the baggage information DB 313. That is, the information related to the user ID, the deposit location, the deposit date, the takeout location, and the takeout date associated with the vehicle ID and the box number is reset. Information related to the level and the availability is not reset.

Figure 11:
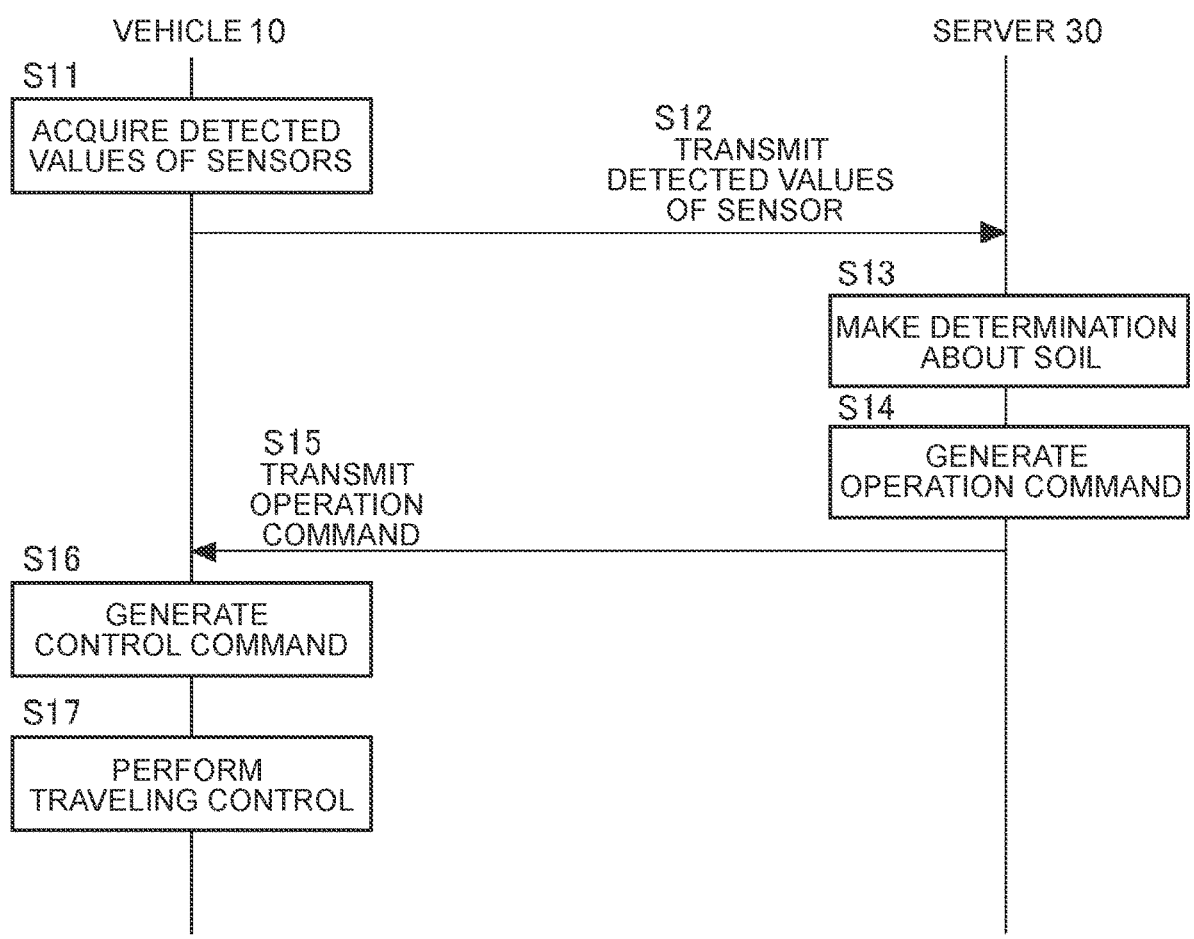
FIG. 11 is a sequence diagram of a process in the entire system when the locker is soiled.

Next, a process in the entire system 1 when the locker 18 is soiled will be described. FIG. 11 is a sequence diagram of the process in the entire system 1 when the locker 18 is soiled. The vehicle 10 periodically acquires the detected values of the soil sensors 181 (S11) and transmits the detected values to the server 30 (S12). The server 30 determines whether soil has occurred based on the detected values of the soil sensors 181 (S13). For example, when the detected value of any soil sensor 181 is equal to or larger than the first threshold or is equal to or larger than the second threshold, the server 30 determines that soil has occurred. When the server 30 determines that soil has occurred, the server 30 generates an operation command including a command to prohibit the use of the box 180 (S14). The operation command is transmitted from the server 30 to the vehicle 10 (S15).

The vehicle 10 that has received the operation command generates a control command to control the drive unit 17 based on the operation command (S16). Then, the vehicle 10 performs traveling control based on the control command (S17).

Figure 12:
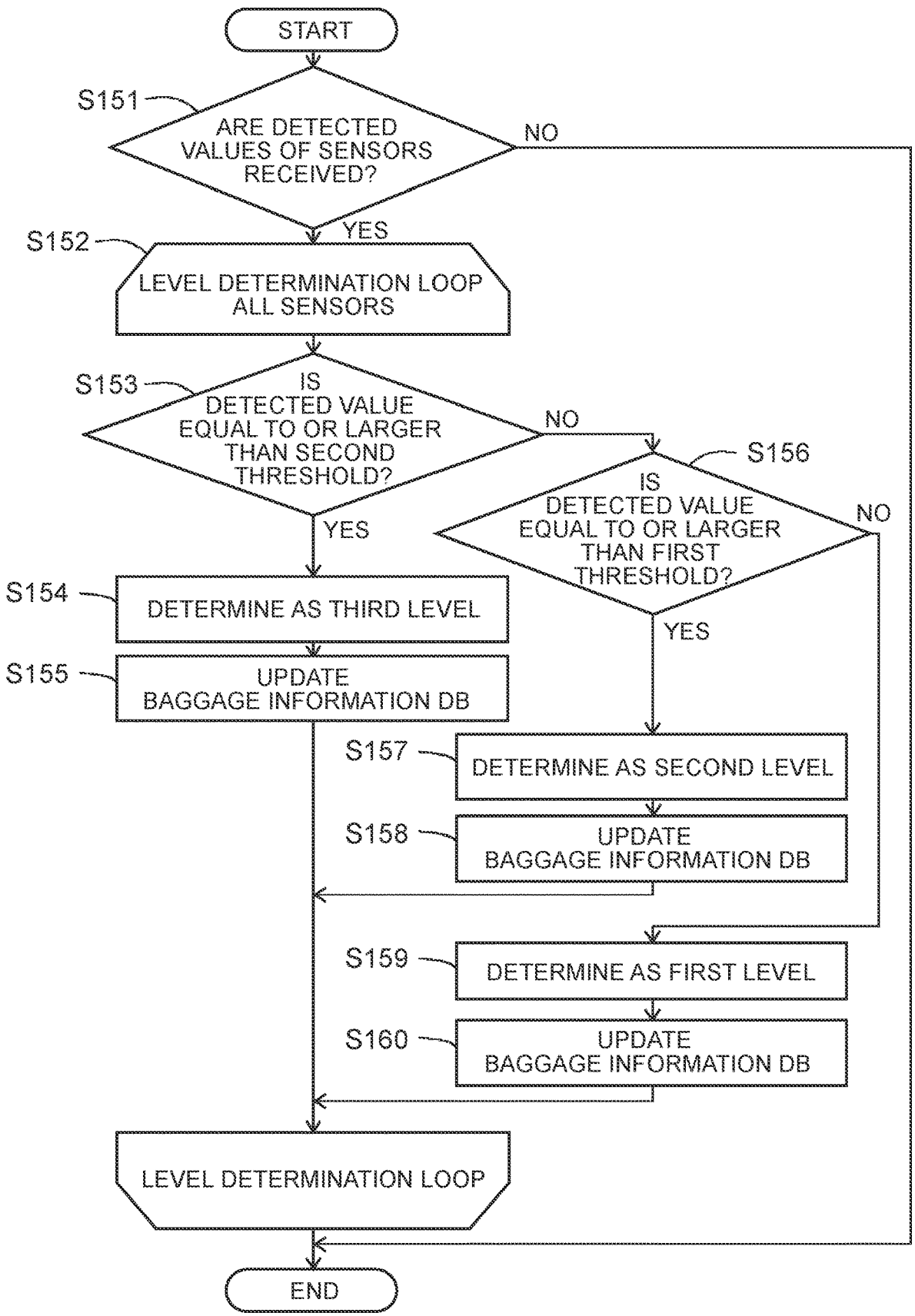
FIG. 12 is a flowchart of a command generation process according to the first embodiment.

Next, a command generation process in the server 30 will be described. FIG. 12 is a flowchart of the command generation process according to the present embodiment. The command generation process shown in FIG. 12 is executed in the server 30 at predetermined time intervals. The description will be given under the assumption that at least one piece of baggage has already been deposited in the box 180. This routine is executed for each vehicle 10.

In Step S151, the baggage management unit 302 determines whether the detected values of the soil sensors 181 associated with the boxes 180 are received from the vehicle 10. The detected values of the soil sensors 181 are associated with box numbers. In the present embodiment, the detected values of all the soil sensors 181 are transmitted from the vehicle 10. Alternatively, only the detected values of the soil sensors 181 that are equal to or larger than the first threshold may be transmitted from the vehicle 10. When the determination result is "Yes" in Step S151, the process proceeds to Step S152. When the determination result is "No" in Step S151, this routine is terminated.

In Step S152, the baggage management unit 302 starts a level determination loop. The level determination loop is repeated until the soil levels are determined for all the soil sensors 181. In Step S153, the baggage management unit 302 determines whether the detected value of the soil sensor 181 is equal to or larger than the second threshold. When the determination result is "Yes" in Step S153, the process proceeds to Step S154. When the determination result is "No" in Step S153, the process proceeds to Step S156. In Step S154, the baggage management unit 302 determines that the soil level of the box 180 associated with the soil sensor 181 is the third level. In this case, determination may be made that the box 180 associated with the soil sensor 181 and the boxes 180 around this box 180 are soiled.

In Step S155, the baggage management unit 302 updates the baggage information DB 313. The baggage management unit 302 updates the level and availability fields of a corresponding record (table) of the vehicle 10 based on the soil level. For the box 180 whose soil level is the third level, the baggage management unit 302 inputs "3" to the level field of the record associated with the box 180 including the soil sensor 181. The baggage management unit 302 inputs a value "No" to the availability fields of the records associated with the box 180 including the soil sensor 181 and the boxes 180 around this box 180. In Step S155, the use of a total of nine boxes 180 that are the box 180 associated with the soil sensor 181 and the boxes 180 around this box 180 is prohibited.

Alternatively, the box 180 to be prohibited from its use may be determined depending on the type or degree of soil. For example, when a liquid has spilled, the use of a box 180 below the box 180 in which the liquid has spilled, that is, a box 180 to which the liquid may flow may be prohibited.

In Step S156, the baggage management unit 302 determines whether the detected value of the soil sensor 181 is equal to or larger than the first threshold. When the determination result is "Yes" in Step S156, the process proceeds to Step S157. When the determination result is "No" in Step S156, the process proceeds to Step S159. In Step S157, the baggage management unit 302 determines that the soil level of the box 180 associated with the soil sensor 181 is the second level.

In Step S158, the baggage management unit 302 updates the baggage information DB 313. For the box 180 whose soil level is the second level, the baggage management unit 302 inputs "2" to the level field of the record associated with the box 180 including the soil sensor 181. The baggage management unit 302 inputs a value "No" to the availability field of the record associated with the box 180 including the soil sensor 181. In Step S158, the use of the box 180 associated with the soil sensor 181 is prohibited.

In Step S159, the baggage management unit 302 determines that the soil level of the box 180 associated with the soil sensor 181 is the first level. In Step S160, the baggage management unit 302 updates the baggage information DB 313. For the box 180 whose soil level is the first level, the baggage management unit 302 inputs "1" to the level field of the record associated with the box 180 including the soil sensor 181. The baggage management unit 302 inputs a value "Yes" to the availability field of the record associated with the box 180 including the soil sensor 181. When the value "No" has already been input, the value "No" is left unchanged. For example, when the baggage management unit 302 inputs, in Step S155, the value "No" to the availability field of a box 180 around the box 180 soiled at the third level, the state of "No" is maintained because of inappropriateness of putting the baggage. Even if the value "Yes" is input in Step S160, the value "No" may be input in Step S155 of the subsequent routine.

In the box 180 where the value "No" is input to the availability field, the user is prohibited from depositing the baggage until cleaning is completed at the cleaning place. For example, the command unit 303 may move the vehicle 10 to the cleaning place at predetermined time intervals to clean the locker 18.

With the first embodiment described above, the soil level of each box 180 of the locker 18 is detected and, when the soil level is high, the use of not only the box 180 but also the surrounding boxes is prohibited. Therefore, it is possible to reduce the occurrence of a case where the baggage is affected by the soil spreading while the vehicle 10 is moving. By prohibiting the use of the soiled box 180, it is possible to suppress discomfort for a user who may subsequently use the box 180.

Second Embodiment

In a second embodiment, a process related to cleaning will be described. In the second embodiment, different operation commands are generated depending on the soil level. For example, when the soil level is the third level, the soil may spread to the surrounding boxes 180 unless the cleaning is carried out immediately. For example, when a liquid spills and flows into another box 180, the baggage of another user may get wet. In a case of a strong odor, the odor may be transferred to the baggage in the surrounding box 180, or a user who uses the surrounding box 180 may have discomfort.

In the second embodiment, when there is any box 180 whose soil level is the third level, the command unit 303 generates an operation command to cause the vehicle 10 to immediately move to the cleaning place. The cleaning places are categorized by the handleable soil levels. The soil levels handled in the cleaning places are stored in the cleaning place information DB 314.

The baggage management unit 302 selects a cleaning place that can handle the vehicle 10 including the locker 18 having the box 180 whose soil level is the third level. Based on the information stored in the cleaning place information DB 314, the baggage management unit 302 extracts cleaning places that can handle the third level and are currently within available periods. The baggage management unit 302 may select the nearest cleaning place from among the extracted cleaning places, or may select the nearest cleaning place to a route for the next dispatch location. In the case of the third level, the cleaning of the locker 18 may be given the highest priority. For example, the locker 18 may be cleaned at the cleaning place even if the arrival at the next dispatch location is delayed as compared with the dispatch date. That is, other baggage may be affected in the case of the third level. Therefore, the cleaning may be given priority to reduce the effect on the other baggage.

When the soil level is the third level, the cleaning may be carried out not only for the box 180 in which the detected value of the soil sensor 181 is equal to or larger than the second threshold, but also for the boxes 180 around this box 180. Alternatively, the box 180 to be cleaned may be determined depending on the type or degree of soil. For example, when a liquid has spilled, the cleaning may be carried out for a box 180 below the box 180 in which the liquid is spilled, that is, a box 180 to which the liquid may flow.

When there is any box 180 whose soil level is the second level, the baggage management unit 302 may generate an operation command to carry out the cleaning at a predetermined timing. The predetermined timing is, for example, a timing when the vehicle passes near a cleaning place (within a range of a predetermined distance from the cleaning place), and is a timing that meets the next dispatch date even if the cleaning is carried out. The cleaning place selected at this time is a cleaning place that can handle the second level or higher and is within an available period. At the second level, the cleaning may be carried out when possible. Alternatively, when there is any box 180 whose soil level is the second level at a predetermined time, an operation command may be generated to cause the vehicle to move to the cleaning place. Still alternatively, when there is any box 180 whose soil level is the second level, an operation command may be generated to carry out the cleaning, for example, during maintenance or battery charging. At this time, the box 180 whose soil level is the first level may be cleaned as well.

The baggage management unit 302 selects a cleaning place that can handle the vehicle 10 including the locker 18 determined to be at the second level. Based on the information stored in the cleaning place information DB 314, the baggage management unit 302 extracts cleaning places that can handle the second level and are available at the predetermined timing. The baggage management unit 302 may select the nearest cleaning place from among the extracted cleaning places, or may select the nearest cleaning place to a route for the next dispatch location. The cleaning places that can handle the second level may include a home of a registered user. For example, even a private user can carry out simple cleaning such as an action of picking up trash in the box 180. In such a case, the user may be requested to clean the vehicle 10 and the vehicle 10 may be moved to the user's home. When the private user has carried out the cleaning, an incentive may be given to this user. Examples of the incentive include electronic money and discount on the usage fee of the locker 18.

Figure 13:
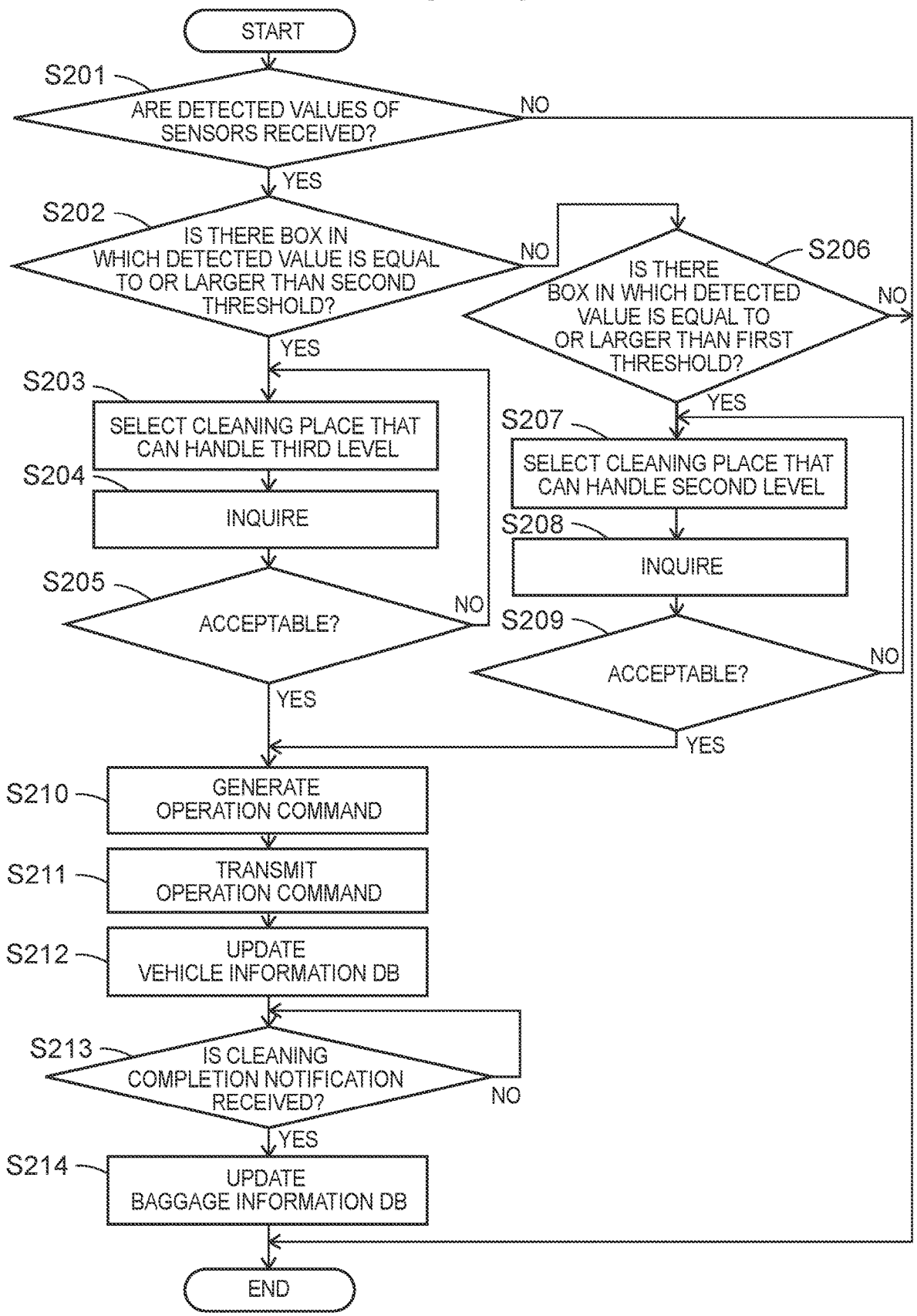
FIG. 13 is a flowchart of a command generation process according to a second embodiment.

Next, a command generation process in the server 30 will be described. FIG. 13 is a flowchart of the command generation process according to the present embodiment. The command generation process shown in FIG. 13 is executed in the server 30 at predetermined time intervals. This routine is executed for each vehicle 10. The process in the flowchart shown in FIG. 13 can be executed independently of the process in the flowchart shown in FIG. 12.

In Step S201, the baggage management unit 302 determines whether the detected values of the soil sensors 181 associated with the boxes 180 are received from the vehicle 10. When the determination result is "Yes" in Step S201, the process proceeds to Step S202. When the determination result is "No" in Step S201, this routine is terminated.

In Step S202, the baggage management unit 302 determines whether there is any box 180 in which the detected value of the soil sensor 181 is equal to or larger than the second threshold. In Step S202, the detected values of all the soil sensors 181 are compared with the second threshold, and all the boxes 180 in which the detected values of the soil sensors 181 are equal to or larger than the second threshold are extracted. When the determination result is "Yes" in Step S202, the process proceeds to Step S203. When the determination result is "No" in Step S202, the process proceeds to Step S206.

In Step S203, the baggage management unit 302 selects a cleaning place that can handle the third level. For example, a cleaning place that is nearest to a current location of the vehicle 10 and is within an available period is selected. The baggage management unit 302 selects the cleaning place based on a current location or a route input in the vehicle information DB 312 and a location, an available period, and a handleable level input in the cleaning place information DB 314.

In Step S204, the baggage management unit 302 transmits an inquiry about acceptance of the vehicle 10 to the cleaning place terminal 40 of the cleaning place selected in Step S203. The baggage management unit 302 generates an inquiry as to whether the vehicle 10 is acceptable, and transmits the inquiry to the cleaning place terminal 40 of the selected cleaning place. In Step S205, the baggage management unit 302 determines whether an answer that the vehicle 10 is acceptable is received. When there is no answer from the cleaning place terminal 40 even after an elapse of a predetermined period, the process may proceed under the assumption that an answer that the vehicle 10 is not acceptable is received. When the determination result is "Yes" in Step S205, the process proceeds to Step S210. When the determination result is "No" in Step S205, the process returns to Step S203 to select another cleaning place. The other cleaning place may be a cleaning place that is next nearest to the vehicle 10. In this way, the process is repeated until the answer that the vehicle 10 is acceptable is received from the cleaning place terminal 40.

In Step S206, the baggage management unit 302 determines whether there is any box 180 in which the detected value of the soil sensor 181 is equal to or larger than the first threshold. In Step S206, the detected values of all the soil sensors 181 are compared with the first threshold, and all the boxes 180 in which the detected values of the soil sensors 181 are equal to or larger than the first threshold are extracted. When the determination result is "Yes" in Step S206, the process proceeds to Step S207. When the determination result is "No" in Step S206, this routine is terminated because cleaning is not necessary.

In Step S207, the baggage management unit 302 selects a cleaning place that can handle the second level. For example, a cleaning place that is located within a range of a predetermined distance from the route of the vehicle 10 and is within an available period is selected. The baggage management unit 302 selects the cleaning place based on a route input in the vehicle information DB 312 and a location, an available period, and a handleable level input in the cleaning place information DB 314. When the soil level is the second level, the effect on the other baggage is small. Therefore, the cleaning is carried out at the cleaning place, for example, when the vehicle 10 passes near the cleaning place.

In Step S208, the baggage management unit 302 transmits an inquiry about acceptance of the vehicle 10 to the cleaning place terminal 40 of the cleaning place selected in Step S207. The baggage management unit 302 generates an inquiry as to whether the vehicle 10 is acceptable, and transmits the inquiry to the cleaning place terminal 40 of the selected cleaning place. In Step S209, the baggage management unit 302 determines whether an answer that the vehicle 10 is acceptable is received. When there is no answer from the cleaning place terminal 40 even after an elapse of a predetermined period, the process may proceed under the assumption that an answer that the vehicle 10 is not acceptable is received. When the determination result is "Yes" in Step S209, the process proceeds to Step S210. When the determination result is "No" in Step S209, the process returns to Step S207 to select another cleaning place. In this way, the process is repeated until the answer that the vehicle 10 is acceptable is received from the cleaning place terminal 40.

In Step S210, the command unit 303 generates an operation command. The operation command is an operation command to cause the vehicle 10 to travel on a route including the cleaning place selected in Step S203 or Step S207. In Step S211, the command unit 303 transmits the operation command to the vehicle 10. In Step S212, the command unit 303 updates the route field of the vehicle information DB 312.

In Step S213, the command unit 303 determines whether a cleaning completion notification is received from the cleaning place terminal 40. The cleaning completion notification is a notification that the cleaning of the locker 18 is completed, and is transmitted from the cleaning place terminal 40 to the server 30 by the cleaning staff inputting predetermined information to the cleaning place terminal 40 when the cleaning is completed. When the determination result is "Yes" in Step S213, the process proceeds to Step S214. When the determination result is "No" in Step S213, the process of Step S213 is repeated.

In Step S214, the baggage management unit 302 updates the baggage information DB 313. The baggage management unit 302 inputs "1" to the level field associated with the record of the box 180 for which the cleaning is completed, and inputs a value "Yes" to the availability field. Then, baggage can be deposited into the box 180.

Figure 14:
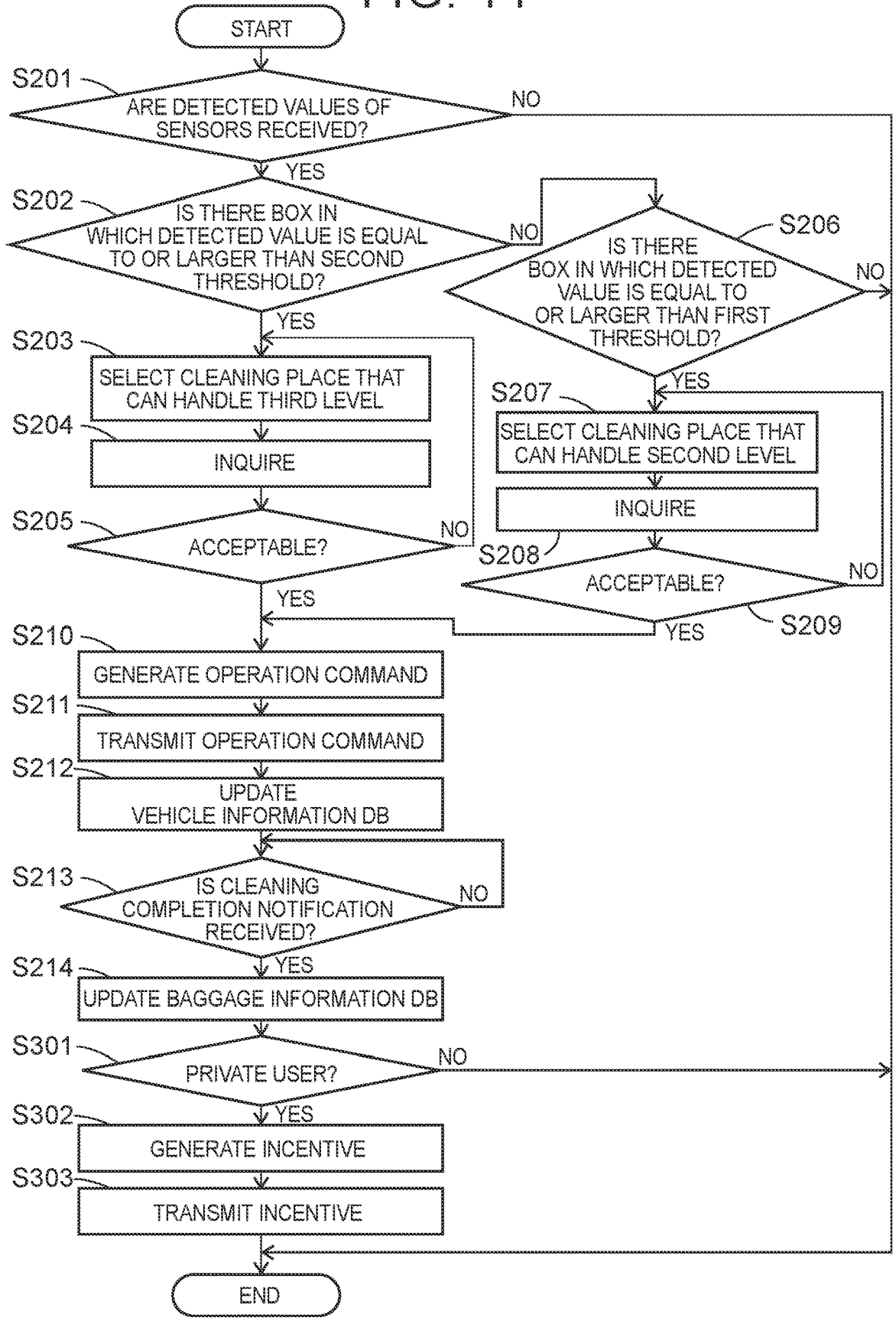
FIG. 14 is a flowchart of a command generation process when a private user has carried out cleaning according to the second embodiment.

FIG. 14 is a flowchart of a command generation process when a private user has carried out cleaning according to the present embodiment. The command generation process shown in FIG. 14 is executed in the server 30 at predetermined time intervals. This routine is executed for each vehicle 10. Since the flowchart up to Step S214 is identical to the flowchart shown in FIG. 12, the same reference symbols are given and description thereof will be omitted.

In the routine shown in FIG. 14, the process proceeds to Step S301 when the process of Step S214 is completed. In Step S301, the command unit 303 determines whether a private user has carried out the cleaning. Information for the determination as to whether the user is a private user is stored in, for example, the cleaning place information DB 314. For example, the cleaning place information DB 314 may include a field for storing information indicating whether the user is a private user. Alternatively, the cleaning place ID may be varied, for example, between private users and other users. When the determination result is "Yes" in Step S301, the process proceeds to Step S302. When the determination result is "No" in Step S301, this routine is terminated.

In Step S302, the command unit 303 generates an incentive. Examples of the incentive include a discount coupon for the usage fee of the locker 18 and electronic money. In Step S303, the command unit 303 transmits the incentive to the cleaning place terminal 40. Examples of the cleaning place terminal 40 include a personal smartphone and a personal computer.

According to the second embodiment described above, appropriate measures can be taken against the soil by changing the cleaning timing and the cleaning place depending on the soil level.

Third Embodiment

In a third embodiment, a process to be performed on a cleaning place will be described. In the cleaning place, it may be necessary to unlock the soiled box 180 for cleaning. At this time, it may be necessary to unlock the box 180 storing baggage. However, it is not preferable to unlock all the boxes 180 unconditionally because there is a risk of theft. In the third embodiment, authentication information is transmitted from the server 30 to the cleaning place terminal 40 to unlock only the soiled box 180. The other devices and the like are the same as those in the first embodiment, and therefore description thereof will be omitted.

The baggage management unit 302 selects a box 180 that can be unlocked depending on the soil level. For example, the box 180 that can be unlocked may be a box 180 prohibited from its use due to soil. That is, when the soil level is the third level, nine boxes 180 including the soiled box 180 and the boxes 180 around the soiled box 180 may be unlocked. When the soil level is the second level, only the soiled box 180 may be unlocked. Alternatively, the boxes 180 around the box 180 prohibited from its use due to soil may be unlocked to check whether the soil has spread to the periphery. Still alternatively, only the boxes 180 whose soil levels are the second level or the third level may be unlocked by giving priority to the privacy of users who have deposited baggage.

The baggage management unit 302 may ask permission from the user who has deposited the baggage when unlocking the box 180 storing the baggage. The baggage management unit 302 acquires a user ID associated with a box 180 in which "2" or "3" is input in the level field of the baggage information DB 313, or a user ID associated with a box 180 in which a value "No" is input in the availability field. Based on the user ID and the user information input in the user information DB, the baggage management unit 302 transmits an inquiry to the user terminal 20 as to whether the box 180 may be unlocked by using, for example, e-mail, a short message service (SMS), or push notification.

The box 180 can be unlocked at the cleaning place only when an answer that permits unlocking is received from the user terminal 20. That is, the box 180 storing the baggage cannot be unlocked at the cleaning place when an answer that does not permit unlocking is received or no answer is received.

The locker 18 is locked or unlocked at the cleaning place by the same process as that of the user terminal 20. That is, the target box 180 can be unlocked when the authentication information is transmitted from the server 30 to the vehicle 10 and the cleaning place terminal 40 and then authentication is successful by establishing communication between the vehicle 10 and the cleaning place terminal 40. Alternatively, the locker management unit 102 may unlock the box 180 to be cleaned, for example, when the cleaning staff inputs a password to the input/output unit 182 at the cleaning place. The password is transmitted from the server 30 to the cleaning place terminal 40. Information on the box 180 to be unlocked is transmitted from the server 30 to the vehicle 10 after the password is input to the input/output unit 182.

Figure 15:
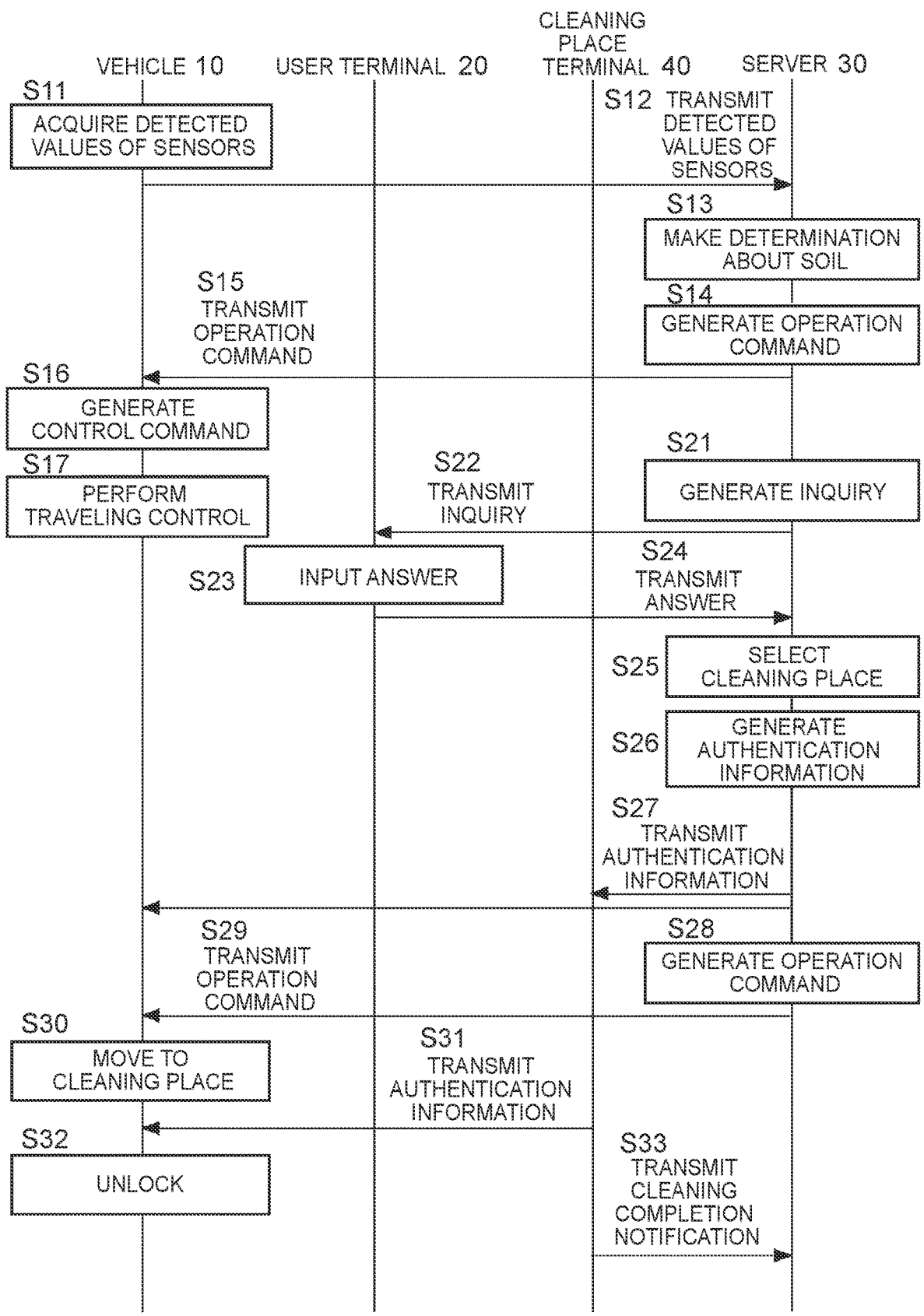
FIG. 15 is a sequence diagram of a process in a system according to a third embodiment.

Next, a process in the entire system 1 when the locker 18 is soiled will be described. FIG. 15 is a sequence diagram of the process in the system 1 according to the third embodiment. Since the sequence diagram up to S17 is identical to the sequence diagram shown in FIG. 11, description thereof will be omitted.

After the operation command to prohibit the use of the soiled box 180 is transmitted, the server 30 generates an inquiry for the user terminal 20 as to whether the box 180 may be unlocked (S21), and transmits the inquiry to the user terminal 20 (S22). In the user terminal 20 that has received the inquiry, the output unit 25 displays the inquiry as to whether to permit unlocking, and also displays a message that prompts the user to answer. The user selects an answer, for example, by tapping a "Yes" or "No" button displayed on the screen. When the user inputs the answer to the input unit 24 (S23), the answer is transmitted to the server 30 (S24).

The server 30 selects a cleaning place based on position information of the vehicle 10 and the soil level (S25). The server 30 generates authentication information for authenticating the cleaning place terminal 40 associated with the selected cleaning place (S26). The authentication information is transmitted to the vehicle 10 and the cleaning place terminal 40 (S27). The server 30 generates an operation command to cause the vehicle 10 to move to the cleaning place (S28), and transmits the operation command to the vehicle 10 (S29).

The vehicle 10 moves to the cleaning place by generating a control command based on the operation command and performing traveling control based on the control command (S30). When the vehicle 10 arrives at the cleaning place, communication between the vehicle 10 and the cleaning place terminal 40 is established, and the authentication information is transmitted from the cleaning place terminal 40 to the vehicle 10 (S31). When the authentication is successful in the vehicle 10, the vehicle 10 unlocks the box 180 to be unlocked (S32). When the cleaning is completed at the cleaning place, a cleaning completion notification is transmitted from the cleaning place terminal 40 to the server 30 (S33). The cleaning completion notification is information indicating that the cleaning is completed and including the vehicle ID and the cleaning place ID. In the server 30 that has received the cleaning completion notification, for example, the baggage information DB 313 is updated.

Figure 16:
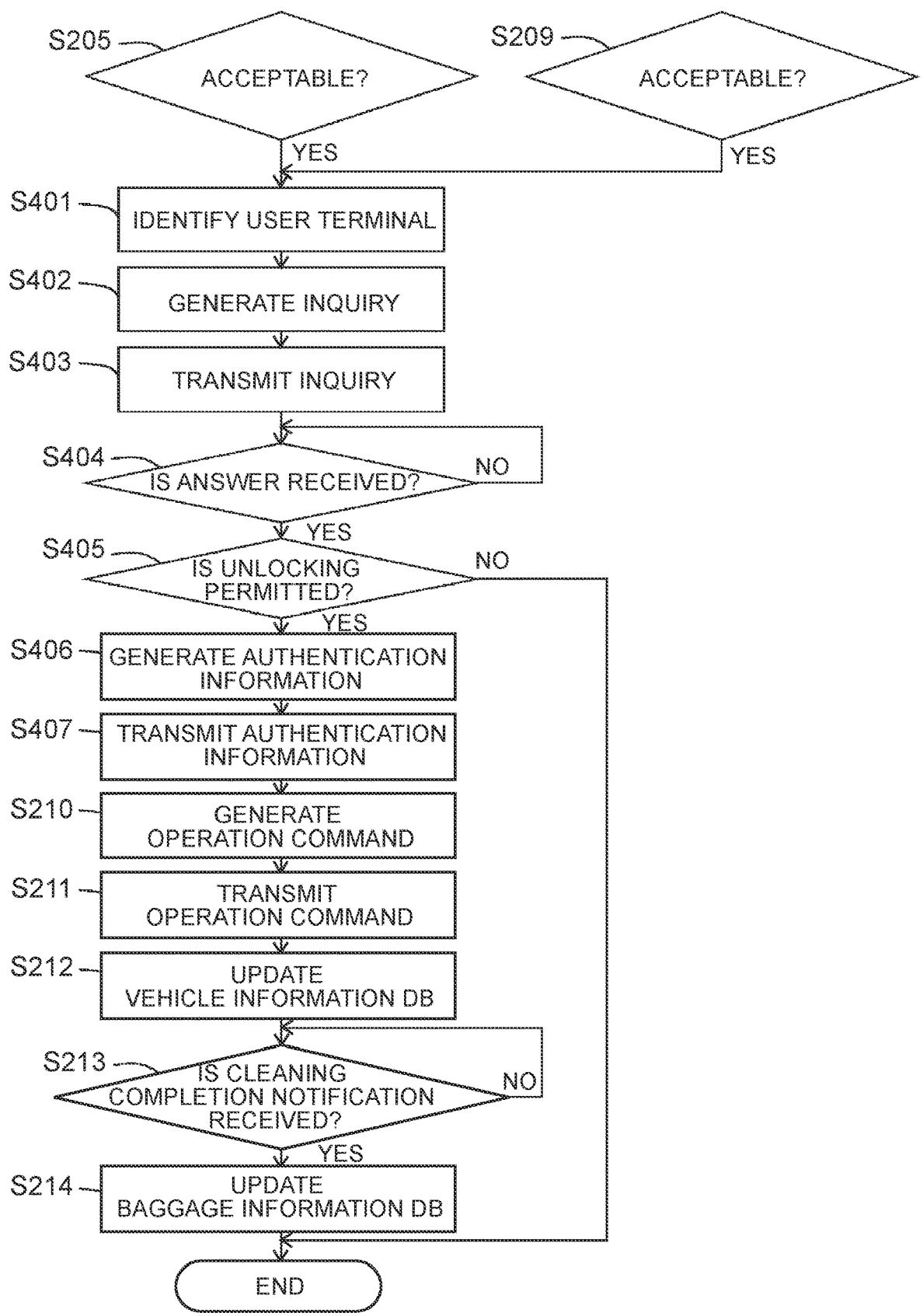
FIG. 16 is a flowchart of a command generation process according to the third embodiment.

Next, a command generation process in the server 30 will be described. FIG. 16 is a flowchart of the command generation process according to the third embodiment. The command generation process shown in FIG. 16 is executed in the server 30 at predetermined time intervals. This routine is executed for each vehicle 10. Since the flowchart up to the positive determination in Step S205 or Step S209 is identical to the flowchart shown in FIG. 13 or 14, illustration and description will be omitted. Steps for executing the same processes as those in the flowchart shown in FIG. 13 or 14 are represented by the same reference symbols and description thereof will be omitted.

In the flowchart shown in FIG. 16, the process proceeds to Step S401 when the determination result is "Yes" in Step S205 or Step S209. In Step S401, the baggage management unit 302 identifies the user terminal 20 of a user who has deposited baggage in the box 180 that needs to be cleaned. The baggage management unit 302 accesses the baggage information DB 313 to extract a user ID input in the user ID field of a record in which "2" or "3" is input in the level field of the target vehicle 10, or a user ID input in the user ID field of a record in which a value "No" is input in the availability field. The user and the user terminal 20 are identified by comparing the user ID with the information stored in the user information DB 311.

In Step S402, the baggage management unit 302 generates an inquiry for the identified user terminal 20 as to whether the box 180 may be unlocked. The inquiry includes a command to cause the output unit 25 of the user terminal 20 to display the inquiry as to whether the box 180 may be unlocked due to soil, and a command to transmit, to the server 30, an answer input to the input unit 24 of the user terminal 20. When a plurality of boxes 180 needs to be unlocked, the inquiry is generated for each of the user terminals 20 associated with the boxes 180. In Step S403, the baggage management unit 302 transmits the generated inquiry to the user terminal 20 identified in Step S401.

In Step S404, the baggage management unit 302 determines whether an answer is received from the user terminal 20. When the inquiry is transmitted to a plurality of user terminals 20, determination is made as to whether answers are received from all the user terminals 20. When the determination result is "Yes" in Step S404, the process proceeds to Step S405. When the determination result is "No" in Step S404, the process of Step S404 is repeated. When no answer is received from the user terminal 20 even after an elapse of a predetermined period, the process may proceed under the assumption that an answer that does not permit unlocking is received.

In Step S405, the baggage management unit 302 determines whether an answer that permits unlocking is received from the user terminal 20. In Step S405, the determination result is "Yes" when the answer that permits unlocking is received from at least one user terminal 20. When the determination result is "Yes" in Step S405, the process proceeds to Step S406. When the determination result is "No" in Step S405, this routine is terminated. When this routine is terminated, the use of the soiled box 180 remains prohibited. Then, the box 180 is cleaned, for example, when the baggage is taken out of the soiled box 180.

In Step S406, the command unit 303 generates authentication information. The authentication information is information for causing the locker 18 to authenticate the cleaning place terminal 40 at the cleaning place and to permit the unlocking of the box 180. The authentication information is generated to unlock a box 180 that stores baggage and can be unlocked with permission received from the user terminal 20. The authentication information may be generated to further unlock a box 180 that does not store baggage. In Step S407, the command unit 303 transmits the generated authentication information to the vehicle 10 and the cleaning place terminal 40. The authentication information generated by the command unit 303 may be a one-time key that is invalidated at a predetermined timing. Examples of the predetermined timing include a timing when the door of the box 180 is closed, a timing when the box 180 is locked, a timing when a cleaning completion notification is transmitted, and a timing when a predetermined period has elapsed.

With the third embodiment described above, only the box 180 permitted by the user is unlocked for cleaning. Therefore, it is possible to suppress invasion of the privacy of the user. In addition, it is possible to suppress theft of baggage.

Fourth Embodiment

In a fourth embodiment, the timing of cleaning is varied based on the number of available boxes 180. For example, when there is a risk that baggage cannot be deposited without cleaning, the number of available boxes 180 is increased by carrying out cleaning. When the use of the soiled box 180 is prohibited without cleaning and baggage can be deposited in the other boxes 180, the cleaning is not carried out immediately but is carried out at a normal frequency. The normal frequency is a frequency of cleaning performed along with maintenance of the locker 18 or battery charging even if the boxes 180 are not soiled. Examples of the normal frequency include once a day and once every several days.

Figure 17:
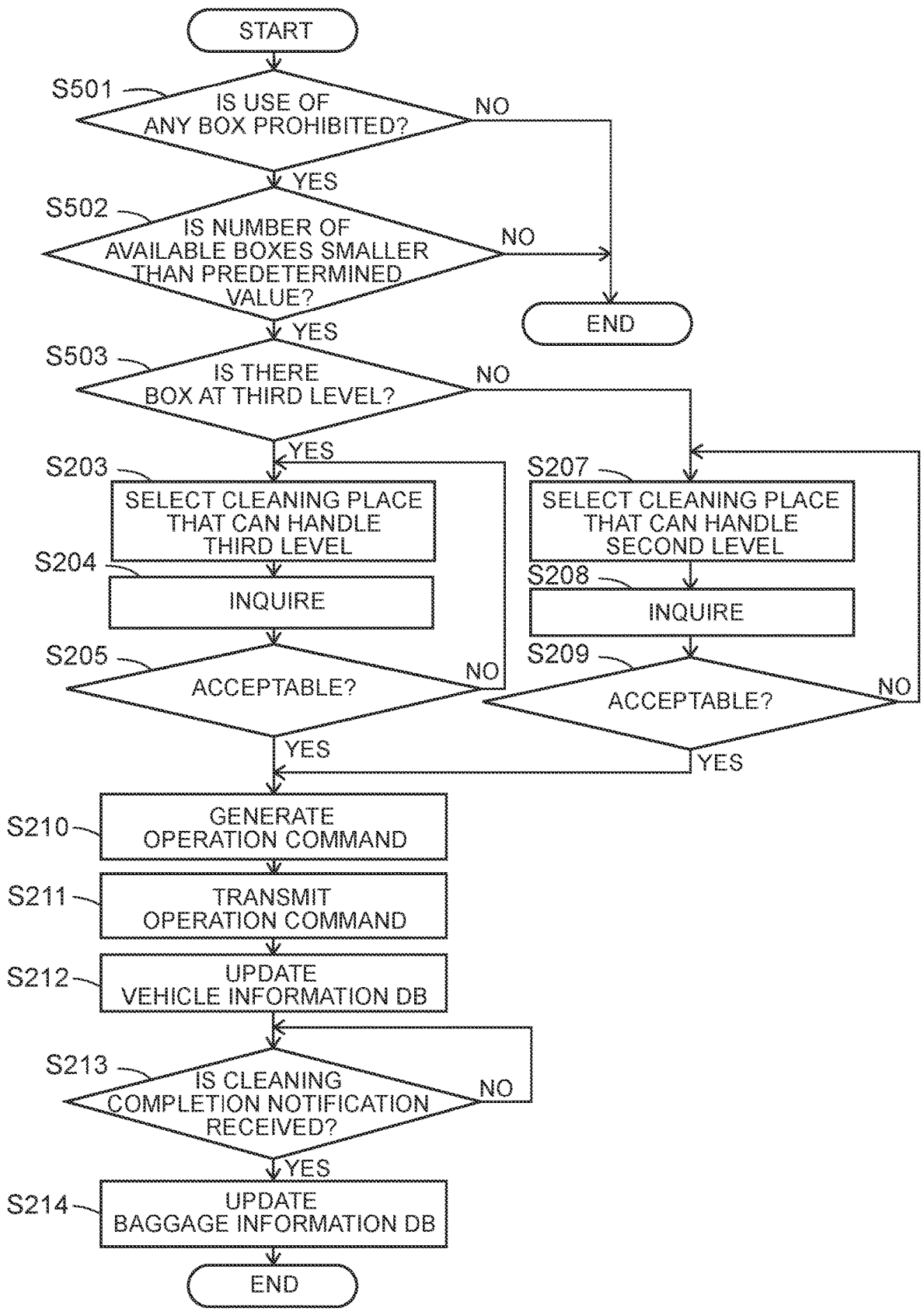
FIG. 17 is a flowchart of a process in a server according to a fourth embodiment.

Next, a process in the server 30 will be described. FIG. 17 is a flowchart of the process in the server 30 according to the fourth embodiment. The process shown in FIG. 17 is executed in the server 30 at predetermined time intervals. This routine is executed for each vehicle 10. Steps for executing the same processes as those in the flowcharts described above are represented by the same reference symbols and description thereof will be omitted.

In Step S501, the baggage management unit 302 determines whether the use of any box 180 is prohibited due to soil. The baggage management unit 302 accesses the baggage information DB 313 to determine whether there is a box 180 in which a value "No" is input in the availability field. When the determination result is "Yes" in Step S501, the process proceeds to Step S502. When the determination result is "No" in Step S501, this routine is terminated.

In Step S502, the baggage management unit 302 determines whether the remaining number of boxes 180 that are not prohibited from their use due to soil is smaller than a predetermined value. The predetermined value is a number at which the users cannot deposit baggage. The predetermined value is stored in the auxiliary storage unit 33 by determining an optimum value in advance. When the determination result is "Yes" in Step S502, the process proceeds to Step S503. When the determination result is "No" in Step S502, this routine is terminated.

In Step S503, the baggage management unit 302 determines whether there is a box 180 whose soil level corresponds to the third level. The baggage management unit 302 accesses the baggage information DB 313 to determine whether there is a box 180 in which "3" is input in the level field. When the determination result is "Yes" in Step S503, the process proceeds to Step S203. When the determination result is "No" in Step S503, the process proceeds to Step S207.

With the fourth embodiment described above, the cleaning is carried out so that the number of unsoiled boxes 180 is equal to or larger than the predetermined value. Therefore, it is possible to reduce the occurrence of a case where the user cannot deposit baggage because of an excessive increase in the number of boxes 180 prohibited from their use.

OTHER EMBODIMENTS

The embodiments described above are merely exemplary, and the present disclosure may be modified as appropriate without departing from the spirit and scope of the present disclosure.

The processes and means described in the present disclosure can freely be combined as long as no technical contradiction occurs.

The process described as being executed by a single device may be executed by a plurality of devices in cooperation. Alternatively, the process described as being executed by different devices may be executed by a single device. In a computer system, the hardware configuration (server configuration) that implements functions can be changed flexibly. For example, the server 30 may have a part of the functions of the vehicle 10. For example, the vehicle 10 may have a part or all of the functions of the server 30.

The present disclosure may be embodied such that a computer program that implements the functions described in the embodiments described above is supplied to a computer and is read and executed by one or more processors of the computer. The computer program may be provided to the computer by being stored in a non-transitory computer-readable storage medium connectable to a system bus of the computer, or may be provided to the computer via a network. Examples of the non-transitory computer-readable storage medium include any type of disk or disc such as a magnetic disk (floppy (registered trademark) disk, hard disk drive (HDD), etc.) and an optical disc (compact disc (CD) ROM, digital versatile disc (DVD), Blu-ray disc, etc.), a read-only memory (ROM), a random access memory (RAM), an EPROM, an electrically erasable programmable ROM (EEPROM), a magnetic card, a flash memory, an optical card, and any type of medium suitable for storing electronic instructions.

What is claimed is:

1. An autonomous delivery vehicle control device, comprising:
 a communications interface configured to communicate with an autonomous delivery vehicle, the autonomous delivery vehicle including a locker having a plurality of boxes, each box configured to store a package, and each box containing a contaminant sensor configured to detect a contaminant value within the box; and
 a processor operatively connected to the communications interface, the processor programmed to: receive from a user, via the communications interface, a package deposit request and a deposit location;
 automatically instruct, via the communications interface, the autonomous delivery vehicle to autonomously travel to the deposit location;
 receive from each contaminant sensor in the autonomous delivery vehicle, via the communications interface, a detected contaminant value within the corresponding box in the locker;
 for each box in the locker, based on the received detected contaminant value, determine a level of the contaminant within the box from among at least a first level, a second level, and a third level; in response to the contaminant level of a box being determined to be the second level, automatically send a signal to the locker, via the communications interface, to automatically lock the box so that no package can be stored in the box; and in response to the contaminant level of a box being determined to be the third level, automatically sending a signal to the locker, via the communications interface, to automatically lock the box and at least one box adjacent to the box so that no package can be stored in the box and the at least one box adjacent to the box.

2. The autonomous delivery vehicle control device according to claim 1, wherein:
 the contaminant sensor comprises a soil sensor.

3. The autonomous delivery vehicle control device according to claim 1, wherein the processor is configured to select the cleaning location based on a type of the contaminant and the determined level of the contaminant.

4. The autonomous delivery vehicle control device according to claim 3, further comprising a storage device configured to store a relationship between the cleaning location the type of the contaminant, and the determined level of the contaminant.

5. The autonomous delivery vehicle control device according to claim 1, wherein the processor is programmed to permit unlocking of the box only after the autonomous delivery vehicle has arrived at the cleaning location.

6. The autonomous delivery vehicle control device according to claim 5, wherein the processor is programmed to permit, at the cleaning location, unlocking of another box in which no package is stored.

7. The autonomous delivery vehicle control device according to claim 1, wherein the processor is programmed to permit, at the cleaning location, unlocking of a box containing a package when unlocking permission has been obtained from a user associated with the package stored in the box to be unlocked.

8. The autonomous delivery vehicle control device according to claim 1, wherein the processor is programmed to instruct, via the communications interface, the autonomous delivery vehicle to move to the leaning location when a number of empty boxes in the locker is smaller than a predetermined value.

9. The autonomous delivery vehicle control device according to claim 1, wherein the cleaning location is a car dealer, a car maintenance shop, a gas station, or a home of a registered user.

10. The autonomous delivery vehicle control device according to claim 9, wherein the processor is programmed to provide an incentive to the registered user when the cleaning location is the home of the registered user.

11. An autonomous delivery vehicle control method implemented by a processor and a communications interface configured to communicate with the autonomous delivery vehicle, the autonomous delivery vehicle including a locker having a plurality of boxes, each box configured to store a package, and each box containing a contaminant sensor configured to detect a contaminant value within the box, the method comprising: receiving from a user, via the communications interface, a package deposit request and a deposit location; automatically instructing, via the communications interface, the autonomous delivery vehicle to autonomously travel to the deposit location; receiving from each contaminant sensor in the autonomous delivery vehicle, via the communications interface, a detected contaminant value within the corresponding box in the locker; for each box in the locker, based on the received detected contaminant value, determining a level of the contaminant within the box from among at least a first level, a second level, and a third level; in response to the contaminant level of a box being determined to be the second level, automatically sending a signal to the locker, via the communications interface, to automatically lock the box so that no package can be stored in the box; and in response to the contaminant level of a box being determined to be the third level, automatically sending a signal to the locker, via the communications interface, to automatically lock the box and at least one box adjacent to the box so that no package can be stored in the box and the at least one box adjacent to the box.

12. The autonomous delivery vehicle control method according to claim 11, wherein the contaminant sensor comprises a soil sensor.

* * * * *